(12) United States Patent
Adams

(10) Patent No.: US 10,486,469 B2
(45) Date of Patent: Nov. 26, 2019

(54) EXPANDED RUBBER ARTICLES

(71) Applicant: Gecko Rubber Limited, Bath (GB)

(72) Inventor: Richard Adams, Bath (GB)

(73) Assignee: Gecko Rubber Limited, Bath (GB)

(\*) Notice: Subject to any disclaimer, the term of this patent is extended or adjusted under 35 U.S.C. 154(b) by 0 days.

(21) Appl. No.: 16/154,901

(22) Filed: Oct. 9, 2018

(65) Prior Publication Data

US 2019/0092097 A1 Mar. 28, 2019

Related U.S. Application Data

(63) Continuation of application No. 15/320,922, filed as application No. PCT/GB2015/051835 on Jun. 23, 2015, now Pat. No. 10,118,443.

(30) Foreign Application Priority Data

Jun. 24, 2014 (GB) .................................. 1411195.9
Jun. 2, 2015 (GB) .................................. 1509561.5

(51) Int. Cl.
*B60C 1/00* (2006.01)
*B60C 7/10* (2006.01)
(Continued)

(52) U.S. Cl.
CPC .............. *B60C 1/00* (2013.01); *B29C 44/027* (2013.01); *B29C 44/0461* (2013.01);
(Continued)

(58) Field of Classification Search
CPC .................. B29C 44/083; B60C 7/105; B60C 2001/0091; B60C 2200/12; B60C 11/02;
(Continued)

(56) References Cited

U.S. PATENT DOCUMENTS 756,670 A 4/1904 Marr
1,140,752 A 5/1915 Leonard
(Continued)

FOREIGN PATENT DOCUMENTS

CN 101204911 A 6/2008
EP 0594072 A1 4/1994
(Continued)

*Primary Examiner* — S. Joseph Morano
*Assistant Examiner* — Jean W Charleston
(74) *Attorney, Agent, or Firm* — Michael A. Bondi; Moss & Barnett

(57) ABSTRACT

Expanded rubber articles and processes for making such, comprising: partially curing an expandable rubber formulation by heating it in a first mould cavity to form a moulded blank; releasing the moulded blank from the first mould cavity and allowing the moulded blank to expand to form an expanded moulded blank; and further curing and expanding the expanded moulded blank by heating it to form the expanded rubber article comprising an expanded rubber part, wherein the expanded moulded blank is heated in a second mould cavity. Optionally, the expanded moulded blank is contacted with a further rubber formulation and a substrate comprising a base material and an elastomer bonding layer in the second mould cavity to form an expanded rubber article additionally comprising a solid rubber part and a substrate.

20 Claims, 5 Drawing Sheets

(51) Int. Cl.

| | | |
|---|---|---|
| *B29D 30/04* | (2006.01) | |
| *B29C 44/08* | (2006.01) | |
| *B29C 44/02* | (2006.01) | |
| *B29C 44/04* | (2006.01) | |
| *C08J 3/24* | (2006.01) | |
| *C08J 5/12* | (2006.01) | |
| *B29D 30/02* | (2006.01) | |
| *C08J 9/00* | (2006.01) | |
| *C08J 9/10* | (2006.01) | |
| *C08K 3/04* | (2006.01) | |
| *C08K 3/34* | (2006.01) | |
| *C08L 7/00* | (2006.01) | |
| *C08L 9/00* | (2006.01) | |
| *B60C 11/02* | (2006.01) | |
| *B29K 9/06* | (2006.01) | |
| *B29K 105/04* | (2006.01) | |
| *B29K 507/04* | (2006.01) | |

(52) U.S. Cl.
CPC ............ *B29C 44/083* (2013.01); *B29D 30/02* (2013.01); *B29D 30/04* (2013.01); *B60C 7/102* (2013.01); *B60C 7/105* (2013.01); *C08J 3/244* (2013.01); *C08J 5/124* (2013.01); *C08J 9/0061* (2013.01); *C08J 9/0066* (2013.01); *C08J 9/10* (2013.01); *C08K 3/04* (2013.01); *C08K 3/346* (2013.01); *C08L 7/00* (2013.01); *C08L 9/00* (2013.01); *B29K 2009/06* (2013.01); *B29K 2105/04* (2013.01); *B29K 2507/04* (2013.01); *B60C 11/02* (2013.01); *B60C 2001/0091* (2013.01); *B60C 2200/12* (2013.01); *C08J 2201/026* (2013.01); *C08J 2201/03* (2013.01); *C08J 2203/04* (2013.01); *C08J 2307/00* (2013.01); *C08J 2309/00* (2013.01); *C08J 2309/06* (2013.01); *C08J 2321/00* (2013.01)

(58) Field of Classification Search
CPC ... B29D 30/04; C08J 2201/03; C08J 2309/00; C08J 2307/00; C08J 2203/04; C08J 2309/06; C08J 2201/026; C08J 2321/00; B29K 2105/04; B29K 2009/06; B29K 2507/04; C08L 7/00; C08L 9/00; C08K 3/04; C08K 3/346
USPC ............................................................ 152/5
See application file for complete search history.

(56) References Cited

U.S. PATENT DOCUMENTS

| | | | | |
|---|---|---|---|---|
| 1,227,791 | A | | 5/1917 | Huebner |
| 2,247,337 | A | * | 6/1941 | Raflovich ............. A47K 13/00 264/241 |
| 2,250,192 | A | | 7/1941 | Cuthbertson |
| 2,394,122 | A | * | 2/1946 | Urmston ................ B29C 44/08 264/46.4 |
| 2,921,344 | A | | 1/1960 | Carrico |
| 3,855,378 | A | | 12/1974 | Topcik |
| 4,060,578 | A | | 11/1977 | Kisbany |
| 8,770,243 | B2 | * | 7/2014 | Lee ......................... B60C 7/105 152/379.3 |
| 2002/0129883 | A1 | * | 9/2002 | O'Coin ............... B29C 44/0461 152/244 |
| 2005/0146068 | A1 | * | 7/2005 | Liu ......................... A43B 17/08 264/51 |
| 2007/0056670 | A1 | | 3/2007 | Sandstrom |
| 2008/0142136 | A1 | | 6/2008 | Folk |
| 2008/0193254 | A1 | | 8/2008 | Selle |
| 2010/0122758 | A1 | | 5/2010 | Huang |
| 2011/0193254 | A1 | | 8/2011 | Kuo |
| 2012/0111468 | A1 | | 5/2012 | Lee |

FOREIGN PATENT DOCUMENTS

| | | |
|---|---|---|
| EP | 16692115 A1 | 6/2006 |
| GB | 591763 A | 8/1947 |
| GB | 720549 A | 12/1954 |
| JP | H01254411 A | 10/1989 |
| WO | 2008153417 A1 | 12/2008 |

\* cited by examiner

EXPANDED RUBBER ARTICLES

REFERENCE TO RELATED APPLICATION

This application is a continuation of application Ser. No. 15/320,922, filed Jun. 23, 2015 which is a US national phase entry of PCT Applic. No. PCT/GB2015/051835, filed Jun. 23, 2015, which claims priority to Great Britain Applic. No. 1509561.5, filed on Jun. 2, 2015, and Great Britain Applic. No. 1411195.9, filed on Jun. 24, 2014, the contents of which are incorporated herein by reference.

FIELD OF THE INVENTION

The present invention concerns expanded rubber articles and methods for their manufacture. The invention also concerns expanded rubber products comprising an expanded rubber part bonded to a solid rubber part, an expanded rubber part bonded to a substrate via a solid rubber part, and methods for the manufacture of expanded rubber articles. More particularly, the present invention concerns expanded rubber bicycle tyres and methods of making expanded rubber bicycle tyres.

BACKGROUND OF THE INVENTION

Expanded rubber materials (also known as foam rubber or sponge rubber materials) are materials formed from a matrix of rubber filled with air in pockets and/or channels. In closed cell expanded rubber materials, the air is contained in discrete pockets, whilst open cell expanded rubber materials comprise interconnected air-filled cells. As used herein, the term "expanded rubber" refers to both open cell and closed cell expanded rubber materials; the term "solid rubber" refers to (at least partially cured) rubber materials that have not been expanded to form an air-filled matrix.

Expanded rubber articles are typically significantly lighter than solid rubber articles of the same volume, and may, for example, be at least 90% lighter. For example, if a natural rubber (NR) part has a specific gravity (SG) of 1.2, an equivalent expanded rubber part typically has an SG of 0.12 or less. A further advantage of expanded rubber articles is that they commonly consist of less rubber material than an equivalently sized solid rubber article, and so may, for example, be less costly to produce. In the automotive and aeronautical industries in particular, reducing weight is especially useful for reducing fuel consumption of vehicles and craft.

Another advantage of expanded rubber materials is that they may have a shore hardness as low as 5 shore A, whilst the minimum shore hardness of solid rubber materials is usually around 30 shore A (as measured using an Instron™ hand-held hardness gauge, Shore A type, according to the ASTM D2240 test method). The softer expanded rubber material offers sealing properties not normally found with solid rubber materials because the expanded rubber is more deformable and thus forms better seals around other objects. In particular, an expanded rubber part may deflect at lower loadings than an equivalently sized solid rubber part because the modulus (which typically decreases with increasing 'softness') of expanded rubber is considerably lower than that of solid rubber. The (open/closed) microcellular structure of expanded rubber confers a lower modulus to the bulk material than the solid structure of non-expanded rubber.

In comparison to solid rubber materials, expanded rubber materials may, for example, offer improved vibration isolation and vibration damping, anti-shock and noise insulation. Expanded rubber materials can be formulated to offer a range of vibration/noise isolation and damping properties. For example, the hysteresis properties of the expanded rubber material can be controlled by including in the expandable rubber formulation different rubber polymers, fillers, process aids and curing systems.

Typically, expanded rubber materials are prepared by the following process. A composition comprising an elastomeric material, a curing agent and an expansion agent are placed in a mould cavity. The composition is heated to activate the curing agent and the expansion agent to cure and expand the composition to fill the mould cavity with an expanded rubber article. Commonly, the mould cavity is sized to confine expansion of the composition, and so a significant pressure builds up inside the mould. Typically, when the mould is opened, the expanded rubber article 'jumps out' and rapidly expands to a size greater than that of the mould cavity. The curing of the composition in the mould may allow the expanded rubber article to maintain the general shape of the mould cavity once released, and the approximate final size of the expanded rubber article may be controlled by the use of an appropriate amount of expansion agent. However, a frequent obstacle to the use of expanded rubber articles is the lack of precision in the shape and size of the expanded rubber article after release from the mould.

Often, it is desirable to bond solid rubber and expanded rubber materials to non-rubber substrates. However, durable bonds between such materials and substrates are difficult to achieve once the rubber has been cured.

Solid rubber materials may be bonded to non-rubber substrates using, for example, an elastomer bonding system and the following process. The part of the non-rubber substrate (for example a metal such as steel) to be bonded is coated with the elastomer bonding system comprising an elastomer bonding adhesive primer (EBAP) and an elastomer bonding adhesive (EBA). EBA's and EBAP's are typically mixtures of polymers, organic compounds and mineral fillers dispersed in organic solvent systems. In the next step, the coated substrate is contacted with a composition comprising an uncured rubber and a curing agent, and then the composition is cured During the curing step, compounds in the elastomer bonding system and compounds in the composition diffuse between the materials and form crosslinking bonds between the cured rubber and the elastomer bonding system (as described in Bonding Elastomers: A Review of Adhesives and Processes, G. Polanski et al., iSmithers Rapra Publishing, 2004).

An obstacle to using the above solid rubber-substrate bonding process with expanded expandable rubber formulations is the difficulty of obtaining a strong and durable bond between the resulting expanded rubber part and the substrate. In particular, the rapid expansion of the expanded rubber upon release from the mould places large stresses on the expanded rubber-elastomer bonding adhesive interface, often inducing tear failure Furthermore, the migration of gas generated by the expansion agent to the interface often promotes delamination.

It is also often desirable to bond expanded rubber materials to solid rubber materials. Solid rubber materials may also be bonded to other solid rubber materials using, for example, an EBA. However, the problems associated with bonding expanded rubber materials to non-rubber substrates also persist when attempting to bond expanded and solid rubber materials together.

A problem with conventional pneumatic tyres, for example pneumatic bicycle tyres, is their susceptibility to puncturing. Modern pneumatic tyres are typically a trade-off between puncture resistance, weight, durability, comfort and road grip. For example, durability and puncture resistance may be improved by using a harder material to form the tyre, but at the cost of road grip. Alternatively, a thicker layer of softer material may improve puncture resistance, but at the cost of weight. It will also be understood that a particular problem for cyclists is a need to carry a bicycle puncture repair kit/spare inner tube and a pump as precaution in case of getting a puncture, all of which add weight. Solid rubber tyres, which are not susceptible to puncture and offer similar or the same road grip as a pneumatic tyre made of the same material, typically suffer from problems of high weight and poor comfort. Recently, cast foam polyurethane materials have been used to make puncture resistant tyres of similar weight to traditional pneumatic tyres. Such products typically also benefit from being very low maintenance because, for example, it is often necessary to 'top-up' the air pressure in a pneumatic tyre at regular intervals. However, polyurethane foam tyres, especially polyurethane foam bicycle tyres, typically suffer from poor ride quality, grip and handling limitations, meaning that the tyres do not behave in the same way as a traditional pneumatic rubber tyre. It will be appreciated that an expanded rubber bicycle tyre should be able to cope with loads of up to 100 kg when installed on a bicycle wheel and provide 5 years or more and/or 5000 miles or more service without discernable and/or significant deterioration of its properties including it's shape, texture, hardness and grip, for example.

The present invention seeks to mitigate the above-mentioned problems. Alternatively or additionally, the present invention seeks to provide an improved process for preparing expanded rubber articles and to provide improved expanded rubber articles.

SUMMARY OF THE INVENTION

In a first aspect, the present invention provides a process for making an expanded rubber article, the process comprising:
a) a moulded blank formation step, in which an expandable rubber formulation, comprising an elastomeric material, a curing agent and an expansion agent, is heated in a first mould cavity to partially cure the expandable rubber formulation thereby forming a moulded blank, wherein the first mould cavity confines expansion of the expandable rubber formulation;
b) a releasing step, in which the moulded blank is released from the first mould cavity and in which the moulded blank expands to a volume larger than the volume of the first mould cavity thereby forming an expanded moulded blank; and,
c) a further curing step, in which the expanded moulded blank is heated to further cure and expand the expandable rubber formulation thereby forming the expanded rubber article;

wherein the expanded moulded blank is heated in a second mould cavity in further curing step (c).

Preferably, the expanded rubber article is a moulded tyre, for example a bicycle tyre.

As used herein, the term elastomeric material refers to a natural or synthetic material comprising polymers and/or oligomers and, optionally, monomers, wherein the material has elastic properties. Preferably, the elastomeric material is a curable rubber, such as a vulcanisable rubber. 'Curable rubbers' are rubber materials capable of being toughened or hardened by crosslinking of polymer and/or oligomer chains in the rubber material. Optionally, the curable rubber is partially cured. Preferably, the elastomeric material is a sulfur-curable rubber. When the expanded rubber article is a tyre, for example a bicycle tyre, it may be that an elastomeric material comprising a sulfur-curable rubber provides a tyre having excellent grip, handling and ride comfort when used on a variety of road and/or track surfaces in various conditions. For example the tyre may have particularly good dynamic physical rubber properties as compared to tyres made from a different expanded material, such as polyurethane foam.

Preferably, the rubber formulation is in the form of a malleable solid at room temperature prior to curing Alternatively, the rubber formulation is a viscous liquid at room temperature prior to curing.

The curing agent is preferably a vulcanisation agent. As used herein, the term 'vulcanisation agent' refers to any substance that promotes crosslinking of elastomeric polymer chains. Preferably, the curing agent is a sulfur-based curing agent. Preferably, the curing agent comprises sulphur. For example, it may be that the process comprises using sulfur, preferably as a crosslinking medium, to at least partially vulcanise the rubber formulation in step (a) and to further vulcanise the rubber of the expanded moulded blank in step (c).

As used herein, the term 'expansion agent' refers to a substance capable of promoting expansion of the expandable rubber formulation, for example via a foaming process. Preferably, the expansion agent is a blowing agent, for example a chemical blowing agent. Chemical blowing agents are substances that undergo chemical reactions to produce gaseous products. Preferably, the expansion agent expands the expandable rubber formulation by evolving a gas, thereby providing a gas-filled rubber matrix in which the gas fills discrete or interconnecting pockets.

Preferably, the curing agent and the expansion agent are thermally-activated and are activated by heating the expandable rubber formulation. Advantageously, a portion of the curing agent and a portion of the expansion agent are activated during the step of heating the expandable rubber formulation in the first mould cavity, and a further portion of the curing agent and a further portion of the expansion agent are not activated during that step. The partial curing and expanding of the expandable rubber formulation by heating in the first mould cavity allows the expandable rubber formulation to be further cured and expanded in the second mould cavity. The further curing and expanding of the expandable rubber formulation in a second mould cavity provides greater control over the shape, dimensions and cure consistency of the expanded rubber article than is typically possible with a single mould expanded rubber article production process.

Preferably, the cavity of the first mould is substantially entirely filled by the expandable rubber formulation, and any optional further rubber formulation(s), prior to heating. For example, the expandable rubber formulation, and any optional further rubber formulation(s), fills at least 95% of the volume of the first mould cavity. It has been found that completely filling the first mould cavity with expandable rubber formulation, and any optional further rubber formulation(s), provides a closed cell expanded rubber material when the expandable rubber formulation is heated.

Optionally, the volume of the expandable rubber formulation, and any optional further rubber formulation(s), prior to heating is smaller than the volume of the cavity of the first mould, for example no more than 90%, preferably no more than 80%, optionally no more than 60% of the volume of the first mould cavity, thereby allowing the expandable rubber formulation, and any optional further rubber formulation(s), to be easily placed in the first mould cavity. It has been found that only partially filling the first mould cavity with expandable rubber formulation, and any optional further rubber formulation(s), provides an open cell expanded rubber material when the expandable rubber formulation is heated.

In embodiments wherein the expandable rubber formulation does not entirely fill the first mould cavity prior to heating, the expandable rubber formulation may, optionally, expand during the moulded blank formation step to fill the first mould cavity. For example, the expandable rubber formulation may be heated in the first mould cavity to partially cure and expand the expandable rubber formulation.

By confining the expansion of the expandable rubber formulation, the first mould cavity controls the shape and size of the moulded blank. When the expansion agent is a blowing agent, the blowing agent evolves an amount of gas that would have a volume greater than the available volume in the cavity of the first mould at the atmospheric pressure and temperature outside of the first mould. For example, the moulded blank may be kept under a pressure greater than the atmospheric pressure outside of the first mould by keeping it confined in the first mould cavity prior to the releasing step.

As used herein, the term 'available volume' refers to the volume of the mould cavity not taken up by the expandable rubber formulation prior to its expansion or further expansion.

By partially curing the expandable rubber formulation during the moulded blank formation step, the expandable rubber formulation takes on the shape of the cavity of the first mould. Preferably, the expandable rubber formulation is only partially cured in the first mould cavity to an extent sufficient for the moulded blank to expand to a volume greater than the volume of the cavity, and rigid enough to maintain the shape of the cavity, when it is released from the first mould cavity.

In the releasing step, the moulded blank is released from the first mould cavity, thereby allowing the moulded blank to expand to a volume larger than the volume of the cavity of the first mould. Preferably, the first stage mould is shaped such that the moulded blank 'jumps out' of the mould as it expands to form an expanded moulded blank during the releasing step. Advantageously, when the expansion agent is a blowing agent, the expansion of the moulded blank during the releasing step is driven by the expansion of the gas evolved by the blowing agent.

By heating the partially cured and partially expanded expandable rubber formulation in a second mould cavity, the size and shape of the expanded rubber article is carefully controlled. Advantageously, the invention provides a process for making expanded rubber articles having a wide range of simple to complex shapes. Advantageously, the invention provides a process for making expanded rubber articles that are more evenly cured than is possible with conventional, single mould expanded rubber article production processes. Advantageously, the invention provides a process giving improved control of the shape and dimensions of the expanded rubber article, and giving improved consistency of physical properties through the expanded rubber article, when compared to conventional expanded rubber article production processes.

Preferably, the volume of the expanded moulded blank is smaller than the volume of the second mould cavity so that the expanded moulded blank can be easily placed in the second mould cavity. Alternatively, the volume of the moulded blank is approximately equal to the volume of the second mould cavity. Optionally, the volume of the moulded blank is larger than the volume of the second mould cavity, in which case the moulded blank is compressed into the second mould. Advantageously, in the further curing step, the expanded moulded blank expands to substantially fill the cavity of the second mould, and takes on the shape of the cavity of the second mould. Optionally, when the expanding agent is a blowing agent, the blowing agent evolves an amount of gas that would have a volume only slightly larger than the available volume of the cavity of the second mould at the atmospheric pressure and temperature outside of the second mould cavity when heated during the further curing step.

For example, the expandable rubber formulation may be expanded by the expansion agent during the further curing step by an amount that is large enough for the expandable rubber formulation to press against, and thus be shaped by, the surface of the cavity of the second mould, and is small enough for the expandable rubber formulation to remain at a volume substantially the same as the volume of the cavity of the second mould after removal from the second mould. Preferably, the volume of the expanded rubber article increases by no more than 10%, especially not more than 5%, on release from the second mould cavity.

Preferably, the expansion of the expandable rubber formulation to form the expanded moulded blank is larger than the expansion of the expanded moulded blank to form the expanded rubber article. Alternatively, the expansion of the expandable rubber formulation to form the expanded moulded blank may be smaller than the expansion of the expanded moulded blank to form the expanded rubber article.

Advantageously, the expandable rubber formulation is further cured during the further curing step to an extent sufficient for the expandable rubber formulation to allow deformation of the expanded rubber article when subjected to stress, and rigid enough to maintain the shape and size of the cavity when not subjected to deforming stress, once the expanded rubber article has been removed from the second mould cavity.

Preferably, the volume of the expanded rubber article (after removal from the second mould) is approximately the same as the volume of the cavity of the second mould, for example when the expanded rubber article is removed from the second mould after cooling to room temperature. Thus, the second mould cavity may control the shape and size of the expanded rubber article more precisely than the first mould cavity controls the shape and size of the expanded moulded blank. For example, when the expanded rubber article is a tyre, such as a bicycle tyre, it may be that the second mould cavity imparts intricate shaping and tread patterning on the tyre.

Preferably, the elastomeric material comprises one or more high viscosity unsaturated rubber polymers. Typically, an expandable rubber formulation comprising a rubber elastomeric material, a blowing agent and a curing agent (and any other optional components, such as oils, fillers and/or anti-degradents) has highly viscous, putty-like consistency. The elastomeric material may, for example, comprise one or more rubber polymers, or be a blend of two or more rubber polymers, selected from the group consisting of natural rubber (NR), styrene butadiene rubber (SBR), butadiene rubber (BR), brominated isobutylene-isoprene based rubber (BIIR), acrylonitrile butadiene rubber (NBR), polychloroprene rubber (CR), ethylene propylene diene monomer rubber (EPDM) and fluorinated elastomers (FKM). In particular, the elastomeric material may comprise NR, BR or SBR, or a blend of NR, BR and SBR. For example, the elastomeric material may comprise a blend of SBR, NR, BR and BIIR It has been found that SBR, BR and NR offer high resilience, good tensile strength and tear resistance, and are widely available materials. Additionally, it has been found that SBR, BR and NR are cost effective elastomeric materials and are often referred to as 'general purpose' rubbers. Preferably the elastomeric material comprises, for example the elastomeric material consists substantially of one or more rubber polymers curable by sulfur vulcanisation.

Advantageously, the curing agent is activated at a temperature of from 120° C. to 170° C. Preferably, the curing agent comprises sulphur, an accelerator and an activator. For example, the curing agent may comprise an accelerator selected from the list consisting of N-cyclohexyl-2-benzothiazyl sulphenamide (CBS), mercaptobenzothiazole (MBT) or tetramethylthiuram disulphide (TMTM). A bisphenol cure system may, optionally, be used with FKM, or a peroxide cure system with EPDM.

The expansion agent may comprise a gas-releasing component that decomposes to evolve gas, especially nitrogen gas, when heated and, optionally, an initiator that initiates decomposition of the gas-releasing component at a temperature lower than the normal decomposition temperature of the gas-releasing component.

Preferably, the optional gas-releasing component is a chemical blowing agent that evolves useful quantities of gas when heated to vulcanisation temperatures, for example when heated to a temperature of from 120° C. to 170° C. Preferably, the chemical blowing agent is stable during processing and in the presence of the curing agent, and is easily dispersed during mixing.

Optionally, the expansion agent comprises a chemical blowing agent selected from the group consisting of azodicarbonamide (ADC), Dinitrosopentamethylene Tetramine (DNPT), ρρ-oxybisbenzene sulphonyl hydrazide (OBSH) and benzene sulphonyl hydrazide (BSH). Preferably, the expansion agent comprises an initiator, or "kicker," to lower the activation temperature of the optional gas-releasing agent. Optionally, the expansion agent comprises a kicker and a chemical blowing agent. The kicker acts as a 'process aid' and may, for example, be selected from the group consisting of acids, bases, organic alcohols and metal compounds.

Optionally, the expandable rubber formulation comprises one or more process aids. Suitable process aids include naphthenic or paraffinic process oil and/or cross-linked oil. Process aids have been found to improve network viscosity during the moulded blank formation step, and, for example, during the expansion of the expandable rubber formulation.

Optionally, the expandable rubber formulation comprises a filler. It has been found that a filler may, for example, reinforce the expanded rubber article. Preferably, the filler is selected from the group consisting of carbon black fillers (such as Super Abrasion Furnace, High Abrasion Furnace, Fast Extrusion Furnace) and other non-black fillers (such as clay, chalk and silica). For example, the expandable rubber formulation may comprise silica and a silane coupling agent. It has been found that the silane coupling agent may, for example, crosslink the filler into the polymer network to improve the physical properties of the vulcanised rubber.

Further optional additives to the expandable rubber formulation include anti-degradents (such as phenylphenylene diamine (DPPD) and/or alkylphenylene diamine (6PPD)).

Preferably, the expandable rubber formulation is mixed to achieve a good level of dispersion prior to the moulded blank formation step. For example, the expandable rubber formulation is mixed until individual raw materials in the mixture are not discernible with the naked eye. In particular, the expandable rubber formulation is mixed using a combination of a two roll mill and an internal mixer, such as a 45 litre Banbury. Optionally, the mixing may include a 'remill' on a two roll mill at least 24 hours after completing internal mixing to further improve the dispersion. Optionally, the rubber polymer, expanding agent, process aids and fillers are added at the start of the mixing cycle, and the curing agent is added towards the end of the mixing cycle. Optionally, the rubber polymer, expanding agent, process aids and fillers are added during a first mixing cycle, and the curing agent is added during a second mixing cycle.

The expandable rubber formulation is heated in a first mould cavity during the moulded blank formation step. Optionally, the first mould cavity is kept closed under high pressure during the moulded blank formation step to resist back-pressure generated by the expansion agent. Such a moulding system is known as compression moulding. The first mould cavity may, for example, be kept closed under high pressure to trap gas released by a gas-releasing agent in the expandable rubber formulation. In particular, the mould may, optionally, be kept closed by using a press, such as a hydraulic press. Preferably, the mould is kept closed to withstand a moulding pressure of at least 20 kg per cm$^2$ per 10 PHR (parts per hundred rubber) of chemical blowing agent.

Other types of high pressure moulding could be used during the moulded blank formation step, such as transfer moulding, for example.

Preferably, the expandable rubber formulation is heated to a temperature of from 120° C. to 170° C. for a period of from 2 to 30 minutes in the first mould cavity during the moulded blank formulation step. For example, the expandable rubber formulation is heated to a temperature of from 130° C. to 160° C. for a period of 10 to 25 minutes, in particular to a temperature of from 140° C. to 150° C. for a period of from 15 to 20 minutes during the moulded blank formation step.

The moulded blank may, for example, 'jump' out from the first mould cavity as it expands to form the expanded moulded blank when the first mould cavity is opened during the releasing step. Preferably, the expanded moulded blank is many times larger than the cavity of the first mould. For example, the volume of the expanded moulded blank may be from 2 to 10 times larger than the volume of the cavity of the first mould, in particular from 5 to 8 times larger.

Preferably, the first mould is shaped to allow the moulded blank to easily slide/pop out of the cavity of the first mould. For example, the shape of the first mould may be designed to prevent the moulded blank from tearing during the releasing step. Particular care may, for example, be required to avoid tearing during the releasing step because the moulded blank is typically more vulnerable to tearing when hot.

Optionally, the expanded moulded blank is left to stabilise after the releasing step and before the further curing step. For example, the expanded moulded blank is left to stabilise for a period of at least 24 hours, in particular a period of a least 3 days. Preferably, the expanded moulded blank is left to stabilise until its volume is substantially constant, for example until the volume of the expanded moulded blank shrinks at a rate of less than 2% per day.

The expanded moulded blank may, for example, be left to stabilise in the second mould cavity prior to the further curing step.

Advantageously, more than one expanded moulded blanks are placed in the second mould cavity. Optionally, the more than one expanded moulded blanks are bonded together during the further curing step to form an expanded rubber article comprising a plurality of further cured expanded moulded blanks. Preferably, the expanded moulded blanks are sized and placed into the second mould to ensure intimate contact between the more than one expanded moulded blanks placed together in the second mould cavity. It has been found that ensuring an intimate contact between a plurality of expanded moulded blanks from the start of the further curing step improves bonding in the expanded rubber product. Optionally, the surfaces of the expanded moulded blanks that are brought into contact with one another are coated with an elastomer bonding agent (EBA).

Preferably, the further curing step is a low pressure heating cycle during which the expandable rubber formulation expands only gently and the second mould cavity thus provides only contact and restraining pressure. For example, the amount of expanding agent included in the expandable rubber formulation, the temperature and duration of the moulded blank formation step, and the temperature and duration of the further curing step may, optionally, be carefully controlled to ensure that the expandable rubber formulation forms an expanded rubber article that has a volume substantially the same as that of the cavity of the second mould.

Preferably, the expanded moulded blank is heated to a temperature of from 110° C. to 190° C. for a period of from 15 to 60 minutes during the further curing step. For example, the expanded moulded blank is heated to a temperature of from 160° C. to 190° C. for a period of from 25 to 50 minutes, in particular to a temperature of from 180° C. to 190° C. for a period of from 40 to 50 minutes during the further curing step. Optionally, the further curing step is carried out in a fan assisted/air circulating oven. Preferably, the expanded moulded blank is expanded by residual expanding agent left over from the moulded blank formation step. Advantageously, the expanded moulded blank expands sufficiently to fill the cavity of the second mould without generating a back-pressure as high as that generated during the moulded blank formation step.

The expansion of the expanded moulded blank in the further curing step may, for example, permit moulding to more complex shapes at higher tolerances than is possible in the moulded blank formation step. In particular, during the further curing step, the partially cured rubber composition of the expanded moulded blank expands and cures further to take on the shape of the cavity of the second mould.

The level of cure and expansion of an expandable rubber formulation comprising an expanding agent that is a chemical blowing agent may, for example, be measured using a moving die rheometer (as supplied by Prescott Instruments Ltd) fitted with a pressure transducer. The instrument measures the pressure of gas coming out of the expandable rubber formulation as it expands, and the increase in torque on the die as the expandable rubber formulation cures.

The expanded rubber article may, optionally, be left to cool before it is removed from the second mould cavity. Preferably, the expanded rubber article is cooled to a temperature of from 10° C. to 80° C. before it is removed from the second mould cavity. For example, the expanded rubber article is cooled to a temperature of around 65° C. before it is removed from the second mould cavity. It has been found that, when the expanded rubber article is removed from the second mould cavity at a temperature of 80° C. or less, the expanded rubber article 'sets' to a volume close to the volume of the cavity of the second mould, and thus closely retains the shape and size of the cavity after removal. For example, the volume of the expanded rubber article is essentially the same as the volume of the cavity of the second mould, such as at least 90% of the volume of the second mould cavity. It has been found that allowing the expanded rubber article to set prior to removal from the second mould improves the consistency of the finished dimensions of the expanded rubber article.

Alternatively, the expanded rubber article may, for example, be removed from the second mould cavity at a temperature greater than 80° C., thereby allowing the expanded rubber article to expand following release from the second mould cavity. For example, the expanded rubber article may expand to a volume at least 1.5 times larger than the volume of the expanded moulded blank. Preferably, the expanded rubber article relaxes and shrinks back to approximately the dimensions of the second mould cavity on cooling to room temperature.

Optionally, the process of the invention additionally comprises a stabilisation step, in which the expanded moulded blank is left to stabilise for a period sufficient that the volume of the expanded moulded blank is substantially constant. The optional stabilisation step is carried out before the additional curing step. By leaving the expanded moulded blank to stabilise, the expanded moulded blank is allowed to reach a constant volume before it is subjected to the further curing step. For example, the moulded blank may, in a first period, undergo a very rapid initial expansion during the releasing step, and then continue to expand more slowly and/or shrink in a second period to form the expanded moulded blank. It has been found that when the expanded moulded blank is left to stabilise, the consistency of the size of the expanded moulded blank and thus that of the expanded rubber article is improved.

Preferably, the process additionally comprises an extrusion step, in which the expandable rubber formulation is extruded to form an expandable rubber formulation extrudate prior to the moulded blank formation step. It may be that the extrudate has a putty-like consistency. Optionally, the extrusion step comprises sizing and shaping the expandable rubber formulation by extrusion to form an extrudate having dimensions approximately the same as the dimensions of the first mould cavity. It may be that the extrusion step comprises forming an extrudate that substantially fills, or is larger than, the first mould cavity. Preferably, when the process comprises an extrusion step prior to the moulded blank formation step, the moulded blank formation step comprises placing the extrudate into the first mould cavity.

Optionally, an insert is present in the first mould cavity. Advantageously, the process additionally comprises placing an insert into the first mould cavity with the expandable rubber formulation, for example a metal insert. The insert advantageously forms a void in the expanded moulded blank. Optionally, a corresponding further insert may be placed in the second mould cavity with the expanded moulded blank. Alternatively, no insert is placed in the second mould cavity during the further curing step. Optionally, the curing of the expandable rubber formulation in the moulded blank formation step, and/or the size of the insert, is controlled to ensure that the void remains open during the further curing step without the use of a further insert in the second mould, and to ensure that the expanded rubber article comprises a corresponding void. It may be that the void of the moulded blank is larger than the corresponding void in the expanded rubber article. Optionally, the void in the expanded moulded blank is substantially filled during the further curing step as the expandable rubber formulation of the expanded moulded blank further expands and cures during the further curing step. For example, the void of the expanded moulded blank is filled by further expansion of the expandable rubber formulation during the further curing step to form an expanded rubber article comprising two or more areas having different densities. Preferably, the void of the expanded moulded blank is filled to form a low density area of the expanded rubber article during the further curing step. It has been found that an expanded rubber article comprising one or more voids and/or areas of differing density has the same or similar structural integrity with reduced weight when compared to a corresponding expanded rubber article prepared without the use of an insert in the moulded blank formation step.

Preferably, an insert is present in the second mould cavity. Optionally, when the expanded rubber article is a tyre, for example a bicycle tire, the insert in the second mould cavity is in the shape of bicycle wheel rim. When the second mould comprises a bicycle wheel rim-shaped insert, it may be that the resulting moulded tyre has a shape that is particularly well matched to the shape of a bicycle wheel rim. It may be that using such an insert is particularly useful when the moulded tyre is shaped and configured to provide an interference fit with a wheel rim when in use.

Preferably, the process further comprises contacting the expandable rubber formulation with an additional rubber formulation during the moulded blank formation step, wherein the additional rubber formulation comprises an elastomeric material and a curing agent, and wherein the additional rubber formulation is at least partially cured during the moulded blank formation step to provide a solid rubber part bound to the expanded rubber part.

Optionally, the first mould cavity is substantially entirely filled, for example at least 95%, preferably at least 100% of the volume of the first mould cavity is filled, with the expandable rubber formulation and the additional rubber formulation. Advantageously, the combined volume of the expandable rubber formulation and the additional rubber formulation is larger, for example up to 10%, preferably up to 5% larger, than the volume of the first mould cavity, and the expandable rubber formulation and the additional rubber formulation are compressed when the first mould is closed. It has been found that the expandable rubber formulation and the additional rubber formulation are brought into intimate contact when the first mould cavity is substantially entirely filled, and that ensuring such an intimate contact improves the strength of the bond between the expanded rubber part and the solid rubber part in the expanded moulded blank and in the resulting expanded rubber article. Preferably, the expanded rubber part and the solid rubber part of the expanded moulded blank are bonded together without the use of an EBA.

Preferably, the thickness of the layer of additional rubber formulation is less than the thickness of the layer of expandable rubber formulation. For example, the layer of additional rubber formulation has a thickness within the range of from 1 to 10 mm, preferably 1 to 5 mm, optionally 1 to 3 mm, and the layer of expandable rubber formulation has a thickness within the range of from 10 to 40 mm, preferably 15 to 35 mm, optionally 20 to 30 mm. It has been found that when the layer of additional rubber formulation used to form a solid rubber part is thinner than the layer of expandable rubber formulation, for example when the thickness of the layer of additional rubber formulation is no more than approximately one fifth, preferably one tenth of the thickness of the layer of expandable rubber formulation, the solid rubber part that is formed is flexible enough to stretch with the layer of expandable rubber formulation and a strong bond forms between the two layers during the moulded blank formation step and during the further curing step.

Preferably, the additional rubber formulation and the expandable rubber formulation are chosen to provide a solid rubber part and an expanded rubber part having comparable hardness. For example, the formulations are chosen so that the Shore A hardness of the expanded rubber part of the expanded rubber article is within the range of from 50 to 90, preferably 60 to 90, and the Shore A hardness of the solid rubber part of the expanded rubber article is within the range of from 40 to 75, preferable 55 to 75. It has been found that the strength of the bond between the solid rubber part and the expanded rubber part is improved when the parts have comparable hardness.

Preferably, the composition of the expandable rubber formulation and the temperature and duration of the moulded blank formation stage are chosen so that the expandable rubber formulation expands only a little during the moulded blank formation stage and upon release from the first mould. For example, the volume of the expanded moulded blank is no more than 20%, preferably no more than 15%, optionally no more than 10% larger than the combined volume of the expandable rubber formulation and the additional rubber formulation prior to heating in the moulded blank formation stage. It has been found that the strength of the bond between the expanded rubber part and the solid rubber part in the expanded rubber article is improved when the bond is not unduly stressed during the moulded blank formation stage and upon release from the first mould.

Optionally, the process further comprises contacting the expanded moulded blank with an additional rubber formulation during the further curing step, wherein the additional rubber formulation comprises an elastomeric material and a curing agent, and wherein the additional rubber formulation is at least partially cured during the further curing step to provide an expanded rubber article comprising a solid rubber part bound to an expanded rubber part.

Preferably, the solid rubber part at least partially cures at the same time that the expanded moulded blank is further cured, thereby forming crosslinking bonds between the expanded rubber part and the solid rubber part of the expanded rubber part.

Preferably, the expanded moulded blank is positioned in the second mould cavity with an additional rubber formulation such that pressure generated by the residual expansion agent during the further curing step presses at least one surface of the expanded moulded blank against at least one surface of the additional rubber formulation.

Advantageously, the elastomeric material of the additional rubber formulation that is contacted with the expandable rubber formulation in the first curing step or the expanded moulded blank in the second curing step is similar to, optionally the same as, the elastomeric material of the expandable rubber formulation. For example, the elastomeric material of the expandable rubber formulation and the elastomeric material of the additional rubber formulation may both comprise one or more rubber polymers selected from the group consisting of SBR, NR, BR and BIR. Preferably, the elastomeric material of the expandable rubber formulation and the elastomeric material of the additional rubber formulation comprise the same rubber polymers. It may be that the rubber polymers are present in different ratios in the elastomeric material of the expandable rubber formulation and the elastomeric material of the additional rubber formulation. Optionally, the elastomeric material of the additional rubber formulation comprises at least one rubber polymer that is not present in the elastomeric material of the expandable rubber formulation.

Alternatively, the elastomeric material of the additional rubber formulation is different to the elastomeric material of the expandable rubber formulation.

By including the same elastomeric material in the expandable rubber formulation and in the additional rubber formulation, the formulations may be more compatible and thus stronger and more durable crosslinking bonds may form between the cured materials than form between less compatible formulations. Alternatively, the elastomeric material of the expandable rubber formulation may, optionally, be different to that of the additional rubber formulation. For example, the elastomeric material of the expandable rubber formulation preferably comprises SBR and BIIR, and the elastomeric material of the additional rubber formulation comprises SBR and NR.

Preferably, the additional rubber formulation comprises no, or a substantially lower proportion of, for example less than 20% of, especially less than 10% of, expansion agent than is present in the expandable rubber formulation.

Advantageously, the flexibility of the solid rubber part relative to the flexibility of the expanded rubber part may be varied to suit the intended use of the expanded rubber article. Optionally, the expandable rubber formulation and the additional rubber formulation comprise different fillers. It has been found that including harder wearing fillers in the additional rubber formulation provides, for example, a solid rubber part that is more wear resistant than the expanded rubber part.

Preferably, ventilation is provided in the first and/or the second mould to improve contact between the expanded moulded blank(s) and/or the additional rubber formulation. For example, when the expanding agent comprises a gas-releasing agent, ventilation is optionally provided in the first and/or the second mould to allow gas generated by the gas-releasing to escape away from the interface between the expanded moulded blank(s) and/or the additional rubber formulation. It has been found that such ventilation improves contact at the interface For example, ventilation holes may be provided in the first and/or the second mould at points close to the interface between the expanded moulded blank(s) and/or the additional rubber formulation, in use.

Preferably, when the expanded rubber article is a tyre, for example a bicycle tyre, a plurality of ventilation holes, for example 16 or more ventilation holes, is provided in the sidewall region of the first and/or second mould. It may be that when the expanded rubber article is a tyre and when the process comprises contacting a solid rubber formulation with the expandable rubber formulation in the first and/or second mould, providing a plurality of ventilation holes in the sidewall area of the first and/or second mould helps to provide an uniform and consistent moulded tyre and to improve the bond between the solid rubber tread and the expanded rubber core of the resulting tyre.

Preferably, the expanded moulded blank is, or the more than one expanded moulded blanks are, sized to fit into the second mould cavity with the optional additional rubber formulation prior to the further curing step such that the bonding surfaces of the expanded moulded blank(s) and the additional rubber formulation are brought into contact with each other from the start of the further curing step. The size of the expanded moulded blank(s) may be controlled, for example, by adjusting the amount of expanding agent included in the expandable rubber formulation and the temperature and duration of the moulded blank formation step. For example, the expanded moulded blank(s) and the additional rubber formulation may be sized such that, when they are transferred into the second mould cavity, the volume of the expanded moulded blank(s) is compressed by up to 10%, thereby providing a contact pressure between the expanded moulded blank(s) and the additional rubber formulation throughout the further curing step. Such contact pressure may improve the bonding between the expanded rubber part and the solid rubber part.

Optionally, the expanded moulded blank, or optionally the more than one expanded moulded blanks, may be transferred into the second mould cavity with the additional rubber formulation before stabilisation of the expanded moulded blank(s) The change in volume, for example shrinkage, during stabilisation of the expanded moulded blank(s) may, optionally, be used to ensure intimate contact with the additional rubber formulation. Advantageously, the expanded moulded blank is arranged around the perimeter (for example in the form of a ring) of an additional rubber formulation, and it may be that the expanded rubber formulation contracts during stabilisation to bring it into intimate contact with the additional rubber formulation (arranged, for example, in the form of a core or an inner ring).

The second mould cavity may, optionally, be partially open away from the bonding interface between the expanded moulded blank and the additional rubber formulation.

Optionally, the process for making an expanded rubber article may additionally comprise a surface preparation step, in which at least part of a surface of the expanded moulded blank is removed, and wherein the surface preparation step is carried out after the releasing step and before the further curing step During the moulded blank formation step, the surface of the expandable rubber formulation in contact with the first mould may, for example, form a 'skin' having a consistency different to the consistency of the interior of the expandable rubber formulation. Optionally, at least some of the skin is removed to improve the consistency of the physical properties of the moulded blank. The skin may, for example, have a different and less desirable flexibility or rigidity to that of the interior of the moulded blank. Advantageously, the removal of at least part of the skin of the moulded blank provides a 'new' surface that may be more easily bonded to other materials, either during or after the further curing step. For example, the new surface may provide a cellular interface and/or an interface comprising an expandable rubber formulation that has been cured to a lesser extent than the expandable rubber formulation of the skin. Thus, the 'new' surface may, for example, provide an improved surface with which to bond the moulded blank to another expanded moulded blank, or to another material (such as a solid rubber, for example). Preferably, at least part of the surface of the expanded moulded blank is removed, for example machined off, to expose a cellular interface of less cured expandable rubber formulation, thereby increasing the number of active sites on the polymers in the expanded moulded blank able to form crosslinking bonds to polymers in another expanded moulded blank, or in the additional rubber formulation, during the further curing step.

Preferably, when the process comprises contacting the expanded rubber formulation with an additional rubber formulation in the moulded blank formation step, the process additionally comprises a co-extrusion step, in which the expandable rubber formulation and the additional rubber formulation (such as a solid rubber/non-expandable rubber formulation) are coextruded. Preferably, the process comprises such a co-extrusion step prior to the moulded blank formation step to form a co-extrudate comprising the expandable rubber formulation and the additional rubber formulation. Optionally, the process comprises placing the co-extrudate in the first mould cavity. For example, when the expanded rubber article is a moulded tyre, such as a bicycle tyre, comprising an expanded rubber core and a solid rubber tread, it may be that the process comprises coextruding the expandable rubber core formulation with the solid rubber tread formulation to form a laminate, wherein the laminate is heated in the first mould cavity in the moulded blank formation step. Such a process may improve the level of wear resistance and improve the grip of the resulting tyre. It may be that such a process provides a particularly efficient method of combining an expandable rubber formulation and an additional rubber formulation in a first mould cavity. It may be that coextruding the expandable rubber formulation and the additional rubber formulation improves the strength of the bond between the formulations.

Preferably, when the expanded rubber article is a tyre, such as a bicycle tyre, comprising an expanded rubber core and a solid rubber tread, the expanded rubber core and/or the solid rubber tread comprises a blend of conventional tyre rubbers. It may be that a tyre comprising traditional, proven rubber materials provides a tyre having similar or the same ride feel as a traditional pneumatic tyre. Preferably, the process comprises moulding a tread pattern into the solid rubber tread during the moulded blank formation step and/or the further curing step. It may be that moulding the tread pattern in the further curing step allows intricate tread patterns to be moulded into the surface of the tyre.

Preferably, the expandable rubber formulation, and the additional rubber formulation when present, is warmed to a temperature of 50 to 120° C., for example 60 to 100° C., such as 65 to 80° C., prior to the moulded blank formation step. Preferably, the warming is carried out for a period of from 10 to 40 minutes, for example from 20 to 30 minutes. It may be that such pre-warming improves the processability and vulcanisation of the rubber formulation and, when an additional rubber formulation is present, strengthen the crosslinking bonds between the rubber formulations in the final expanded rubber article. For example, it may be that such pre-warming improves the tear resistance of the resulting expanded rubber article, especially of the expanded rubber part of the expanded rubber article.

Preferably, when the expanded rubber article is a moulded tyre, for example a bicycle tyre, the expanded rubber core of the bicycle tyre has a high modulus. The modulus can, for example, be measured using an Instron hand held Shore A hardness gauge. Preferably, the expanded rubber core has a modulus of from 45 to 70 Shore A, for example 45 to 65 Shore A. It may be that the modulus of the expanded rubber core varies as between the centre of the core and the skin at the surface of the expanded rubber core. Preferably, the expanded rubber core has a modulus of at least Shore A, for example at least 50 Shore A, at the centre of the core and/or a modulus of no more than 70 Shore A, for example no more than 65 Shore A, at the surface skin of the core. Preferably, the expanded rubber core has a density of from 0.6 to 0.7 kg/litre, for example approximately 0.65 kg/litre. Preferably, the solid rubber tread of the tyre has a hardness of from 60 to 70 Shore A, for example approximately 65 Shore A. It may be that a high modulus, low density expanded rubber tyre has very good dynamic and physical properties whilst also being light as compared to solid rubber material, and can resist loads of up to 100 kg and provide at least 5 years and/or 5000 miles of use. It may be that such a tyre is particularly durable.

Preferably, the process is a process for making an expanded rubber article comprising an expanded rubber part bonded to an additional rubber part, the expanded rubber article being a moulded tyre having a tread formed by the additional rubber part, the process comprising:

a) a moulded blank formation step, in which an expandable rubber formulation, comprising an elastomeric material, a curing agent and an expansion agent, is heated in a first mould cavity to partially cure the expandable rubber formulation thereby forming a moulded blank, wherein the first mould cavity confines expansion of the expandable rubber formulation;

b) a releasing step, in which the moulded blank is released from the first mould cavity, and in which the moulded blank expands to a volume larger than the volume of the first mould cavity thereby forming an expanded moulded blank; and, c) a further curing step, in which the expanded moulded blank is heated in a second mould cavity to further cure and expand the expandable rubber formulation thereby forming the expanded rubber article;

wherein, either:

i) an additional rubber formulation comprising an elastomeric material and a curing agent is contacted with:

the expandable rubber formulation in the moulded blank formation step, wherein the additional rubber formulation is partially cured with the expandable rubber formulation during the moulded blank formation step (a) to provide a moulded blank comprising a partially cured and expanded rubber part bound to a partially cured additional rubber part, and wherein the rubber of the partially cured additional rubber part is a solid rubber; and/or the expanded moulded blank in the further curing step, wherein the additional rubber formulation is at least partially cured during the further curing step (c) to provide the expanded rubber article comprising an additional rubber part bound to an expanded rubber part, and wherein the rubber of the additional rubber part is a solid rubber;

or:

ii) a substrate comprising a cured solid rubber is contacted with the expanded moulded blank in the further curing step to provide the expanded rubber article comprising an additional rubber part bound to an expanded rubber part.

In a second aspect, the invention provides a process of making an expanded rubber product comprising an expanded rubber article and a substrate, wherein the expanded rubber article is made by the process of the first aspect of the invention. Preferably the substrate is present in, or forms at least part of, the second mould cavity during the further curing step (c). Optionally, the expanded rubber article and the substrate of the expanded rubber product fit together with an interference fit Preferably, the expanded rubber article formed in the method of the second aspect of the invention includes an expanded rubber part and a solid rubber part.

Optionally, when the expanded rubber article includes an expanded rubber part and a solid rubber part, the solid rubber part is formed from the substrate. For example, it may be that the substrate is a cured solid rubber.

Preferably, the expanded rubber product is a tyre, for example a bicycle tyre. Optionally, the substrate is a bicycle wheel Optionally, the substrate is a cured solid rubber tread.

Optionally, the additional rubber formulation is contacted with a substrate during the further curing step. Preferably the optional additional rubber formulation is at least partially cured during the further curing step to form a solid rubber part that bonds the expanded rubber article to the substrate. Optionally, the substrate comprises a base material at least partially coated with an elastomer bonding agent. Optionally, the additional rubber formulation is contacted with the elastomer bonding agent during the further curing step (c). Preferably, the additional rubber formulation and/or optional elastomer bonding agent adheres the substrate to the expanded rubber part via the solid rubber part once cured. It has been found that, during the further curing step, rubber polymers and/or oligomers in the additional rubber formulation form crosslinking bonds with rubber polymers and/or oligomers in the expandable rubber formulation, and with polymers and/or oligomers in the elastomeric bonding agent. Thus, advantageously, the further curing step provides an expanded rubber article bonded to a substrate via a solid rubber part.

Preferably, the substrate comprises a base material selected from the group consisting of metal (for example aluminium or metal alloys such as steel or stainless steel), Carbon Fibre (including thermoset resin coated carbon fibre), polyamide, polycarbonate and cured solid rubber. Thus, the invention advantageously provides a means of strongly and durably bonding an expanded rubber article to a metal substrate.

The substrate advantageously further comprises an elastomer bonding agent EBA). For example, the substrate may comprise a cured solid rubber, in particular a cured solid rubber at least partially coated with a layer of an EBA. For example, the substrate may comprise a metal, in particular a metal at least partially coated with a layer of an elastomer bonding agent primer (EBAP) overlaid with a layer of an EBA.

It has been found that the solid rubber layer provides a more durable bond between the expanded rubber part and the substrate than would be provided by bonding the expanded rubber part directly to the substrate. For example, the 'rubber tear' of the bond may be reduced, initially with no failure at the bonding interfaces between the solid rubber and the expanded rubber part and between the solid rubber part and the elastomer bonding agent of the substrate. Advantageously, the bond may remain strong for at least 10 years. In particular, the bond may resist aging for significantly longer than bonds formed between expanded rubber parts and substrates 'post process,' for example bonds formed by bonding expanded rubber parts to substrates using conventional adhesive systems such as structural epoxy adhesives, acrylic- or NR-based pressure sensitive adhesives, cyanoacrylates (Superglues) or rubber contact adhesives.

It has been found that the bond between the expanded rubber part and the substrate via the solid rubber part outperforms conventional expanded rubber adhesive systems in peel tear resistance tests following accelerated aging in an air oven, in particular after heating the bonded expanded rubber product to a temperature of 100° C. for 24 hours.

In a third aspect, the invention provides an expanded rubber product comprising an expanded rubber part, a solid rubber part, and a substrate comprising a base material at least partially coated with an elastomer bonding agent, wherein the expanded rubber part is bound to the substrate via the solid rubber part. The expanded rubber product of the third aspect is advantageously made by the process of the second aspect of the invention. It has been found that, by bonding the expanded rubber part to the base material coated with an elastomer bonding agent via a solid rubber part, the expanded rubber part and the substrate may be held together by a strong and durable bond.

Advantageously, both the expanded rubber part and the solid rubber part comprise one or more rubber polymers selected from the list consisting of NR, BR and SBR. Such polymers have been found to offer high resilience, good tensile strength and tear resistance, and are widely available materials. Additionally, SBR, BR and NR are cost effective elastomeric materials.

Preferably, the expanded rubber part and the solid rubber part comprise the same rubber polymers. It has been found that by including the same rubber polymers in the expanded rubber part and in the solid rubber part, the bonds between the parts may be stronger and more durable than between parts comprising different rubber polymers.

Preferably, the substrate of the expanded rubber product, made in the process of the second aspect of the invention, or of the third aspect of the invention, is a metal. For example, the substrate is a metal alloy. The invention advantageously provides an expanded rubber product comprising an expanded rubber part strongly and durably bound to a metal substrate.

Optionally, the expanded rubber part of the expanded rubber product is bound to the substrate by means of crosslinking bonds between the expanded rubber part and the solid rubber part, and further crosslinking bonds between the solid rubber part and the elastomer bonding agent. For example, the expanded rubber part is bound to the solid rubber part by means of crosslinking bonds between rubber polymers in the expanded rubber part and rubber polymers in the solid rubber part, and between the elastomer bonding agent and rubber polymers in the solid rubber part.

Optionally, the expanded rubber product may comprise an expanded rubber part, two or more solid rubber parts and a substrate, wherein the expanded rubber part is bound to the substrate via at least one of the two or more solid rubber parts. For example, the expanded rubber product may be a wheel comprising a metal (for example aluminium) wheel rim at least partially coated with an EBAP and/or an EBA and a tyre comprising an expanded rubber part, wherein a solid rubber part is disposed between the wheel and the tyre and bonds the wheel to the tyre, and wherein the tyre also comprises a tread layer comprising a second solid rubber part bonded to the outer surface of the expanded rubber part. Optionally, the tread layer is laminated onto the expanded moulded blank during the moulded blank formation step.

Preferably, the expanded rubber article is a moulded tyre, for example a bicycle tyre. Preferably, when the expanded rubber article is a moulded tyre, the substrate is a wheel hub.

In a fourth aspect, the invention provides a moulded tyre, wherein the moulded tyre is made according to the first aspect of the invention. The moulded tyre comprises an expanded rubber core, for example in the shape of an inner ring, and a solid rubber tread, for example in the shape of an outer ring. The expanded rubber core may be bound to the solid rubber tread by means of cross-linking bonds.

Preferably, the moulded tyre is made by the process of the first aspect of the invention comprising:

a) a moulded blank formation step, in which an expandable rubber formulation, comprising an elastomeric material, a curing agent and an expansion agent, and an additional rubber formulation, comprising an elastomeric material and a curing agent, are heated in a first mould cavity to partially cure the expandable rubber formulation and optionally at least partially cure the additional rubber formulation thereby forming a moulded blank comprising a partially cured and expanded rubber part bonded to a partially cured solid rubber part, wherein the first mould cavity confines expansion of the expandable rubber formulation;

b) a releasing step, in which the moulded blank is released from the first mould cavity, and in which the moulded blank expands to a volume larger than the volume of the first mould cavity thereby forming an expanded moulded blank; and, c) a further curing step, in which the expanded moulded blank is heated to further cure and expand the expandable rubber formulation and cure or further cure the additional rubber formulation thereby forming the moulded tyre comprising an expanded rubber part bonded to a solid rubber part;

wherein the expanded moulded blank is heated in a second mould cavity in further curing step (c). Preferably, the ratio of the depth of the solid rubber tread to the depth of the expanded rubber core is within the range of from 1:5 to 1:20, for example from 1:8 to 1:15, especially 1:9 to 1:11. Optionally, the solid rubber tread has a Shore A hardness within the range of from 40 to 80, for example 50 to 75, especially 55 to 65. Preferably, the expanded rubber core has a Shore A hardness within the range of from 50 to 90, for example 60 to 85, especially 70 to 80.

Preferably, the moulded tyre comprises a plurality of expanded rubber portions, wherein the expanded rubber portions are bound together by means of crosslinking bonds, for example cross linking bonds formed during the further curing step. Optionally, the moulded tyre is made by a process in which more than one expanded moulded blanks are heated in the second mould cavity. It has been found that forming the moulded tyre from a plurality of expanded rubber portions improves the efficiency of the manufacturing process, for example by improving the level of control of the shape and dimensions of the moulded tyre. Optionally, a layer of EBA is disposed between the expanded rubber portions to improve the bond between the portions.

Preferably, the moulded tyre is a bicycle tyre. An expanded rubber moulded bicycle tyre may have lower maintenance requirements (for example, no maintenance requirements) and improved (for example complete) puncture resistance as compared to a traditional pneumatic tyre. Preferably, the bicycle tyre comprises an expanded rubber core and a solid rubber tread bonded to the expanded rubber core by crosslinking bonds. A bicycle tyre having an expanded rubber core and a solid rubber tread may provide substantially the same ride quality, road grip and durability as a traditional rubber pneumatic tyre and feel, to the bike rider, substantially the same as a traditional rubber pneumatic tyre. Preferably, the solid rubber tread comprises one or more rubber polymers selected from the group consisting of styrene butadiene rubber, butadiene rubber and natural rubber. It may be that using a rubber based formulation for the tyre tread comprising one or more rubber polymers used in pneumatic tyre treads better mimics the ride feel of a traditional pneumatic tyre than, for example, a polyurethane foam tyre. Preferably, the bicycle tyre has a closed cell expanded rubber core. Preferably, the solid rubber tread is arranged such that when the tyre is mounted on a wheel, the solid rubber tread and the wheel cooperate to substantially entirely (for example entirely) surround the expanded rubber core. Preferably, the solid rubber tread comprises at least one bead to retain the tyre in the hub of a bicycle wheel. For example the solid rubber tread preferably comprises two beads (such as two ring-shaped beads) around the inside of the tyre to secure the tyre in the hub of a bicycle wheel, for example by engaging with corresponding beads typically provided on the inside of the rims of a bicycle wheel.

It may be that an expanded rubber tyre, such as a bicycle tyre, can be recycled more easily than, for example, a traditional pneumatic tyre and inner tube. It may be that the expanded rubber article, for example an expanded rubber tyre, can be crumbed and incorporated into other rubber products at the end of its useful life. Preferably, the expandable rubber formulation and/or the additional rubber formulation comprises recycled rubber.

Preferably, the moulded bicycle tyre is sized and configured to have a resistance fit between the rims of a bicycle wheel. It may be that the moulded bicycle tyre is provided with beads on each sidewall which are shaped and configured to cooperate with beads on the inside of the rims of a bicycle wheel to provide a resistance fit with the bicycle wheel.

Preferably, the moulded bicycle tyre comprises a plurality of clips sized and configured to engage with a bicycle wheel to hold the tyre in place on the wheel. Preferably, each clip is in the form of a staple, for example a metal staple (such as a stainless steel metal staple) or a glass filled nylon staple (such as a glass filled nylon staple comprising approximately 30% glass). Preferably, the clip is at least partially embedded in the moulded tire, for example at least partially embedded in the expanded rubber core of the tyre. It will be appreciated that it is particularly important to have a core material with a high tear strength when using such embedded clips. Preferably, the tyre comprises at least 10, for example at least 16 clips, substantially equally spaced around the inner circumference of each tyre sidewall. Preferably, the plurality of clips is arranged to be pushed into place at least partially under the edge of the rim (for example entirely under the rim) of a bicycle wheel, thereby resiliently holding the tyre in place on the wheel. Preferably, the clips are arranged so that the tyre can be pushed into place inside the rims of the bicycle wheel without damaging the tyre, for example by pushing against the clips rather than the rubber surface of the tyre. Preferably, each clip has the shape of a flattened U, a span of around 17 mm, a height of around 18 mm, a width or around 3.5 mm and a material thickness of around 1.5 mm. In use, it may be that the clips allow the tyre to be fitted onto the bicycle wheel by stretching the tire around the wheel as one sidewall of the tire and the clips on that sidewall of the tire are placed between the rims of the bicycle wheel and then pushing the clips on the other sidewall between the rims to compress the tire into place. It may be that the clips are sized and configured such that they can be conveniently pushed into place using a flat-headed screwdriver or a similar tool.

Optionally, the expanded rubber core of the moulded tyre comprises at least one void, for example the expanded rubber core comprises a plurality of voids approximately equally spaced along the length of the expanded rubber core.

Advantageously, the expanded rubber core comprises a plurality of sections having different densities. For example, the expanded rubber core comprises an outer section having a first density and at least one inner section having a second density, wherein the first density is greater than the second density.

It will of course be appreciated that features described in relation to one aspect of the present invention may be incorporated into other aspects of the present invention. For example, the product of the invention may incorporate any of the features described with reference to the process of the invention and vice versa. In particular, any feature of the first, second and/or third aspect of the invention may be incorporated into the fourth aspect of the invention. For example, the moulded tyre of the fourth aspect of the invention may be combined with the process of the second aspect of the invention to form a product comprising a moulded tyre bonded to a substrate.

BRIEF DESCRIPTION OF THE DRAWINGS

Embodiments of the present invention will now be described, by way of example only, with reference to the accompanying schematic drawings of which.

DETAILED DESCRIPTION OF THE INVENTION

Figure 1:
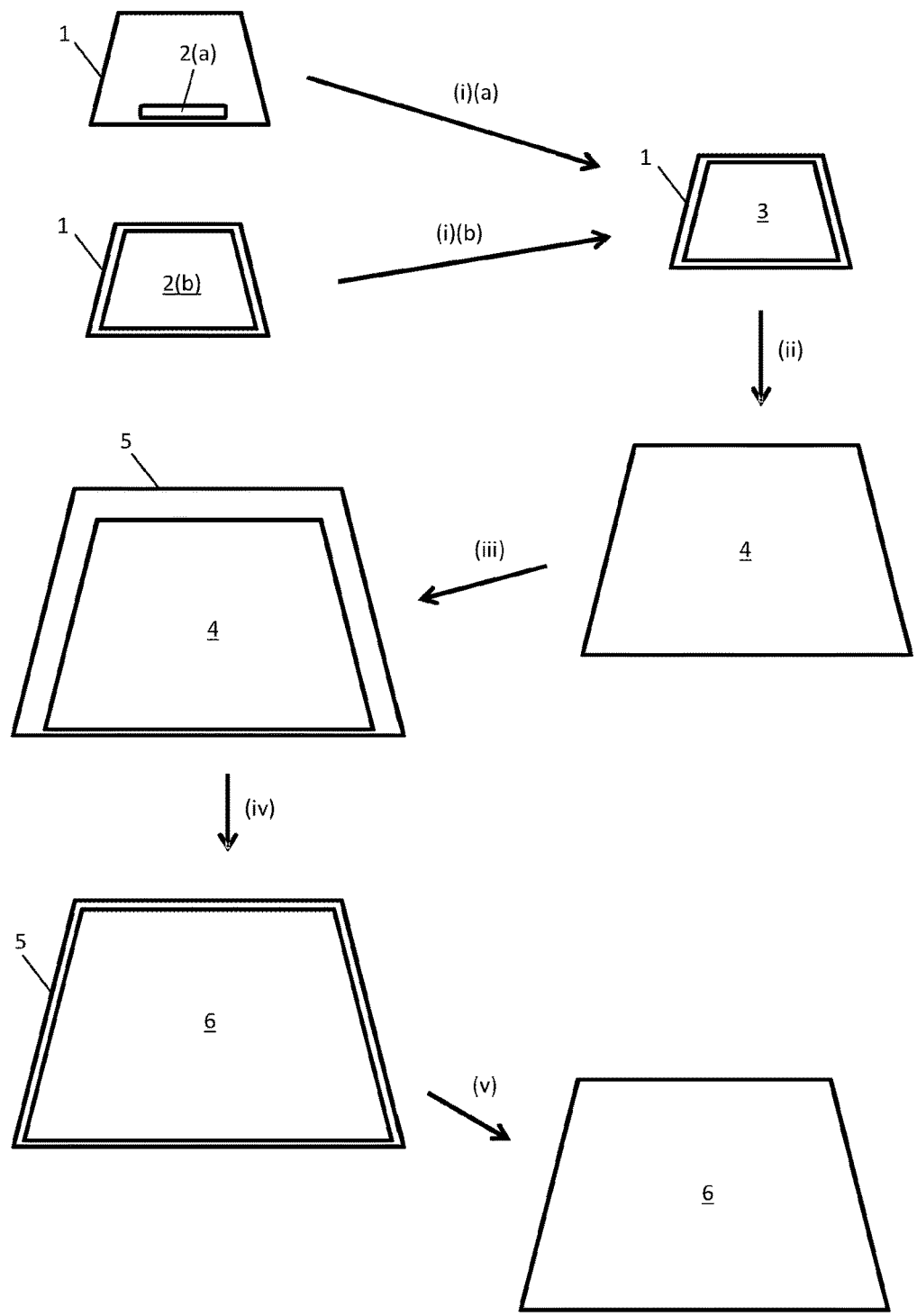
FIG. 1 shows a depiction of the steps of a process according to a first embodiment of the invention.

FIG. 1 shows a first embodiment of a process for making an expanded rubber article 6 according to the first aspect of the invention To form an expanded rubber article comprising an open cell expanded rubber article, a cavity of a first mould 1 is partially filled with an expandable rubber formulation 2(*a*). During a moulded blank formation step (i)(a), the expandable rubber formulation 2(*a*) is heated to partially cure and expand it to form a moulded blank 3.

To form an expanded rubber article comprising a closed cell expanded rubber article, a cavity of first mould 1 is substantially entirely filled with an expandable rubber formulation 2(*b*). During a moulded blank formation step (i)(b), the expandable rubber formulation 2(*b*) is heated to partially cure and expand it to form a moulded blank 3.

The remaining steps of the process according to the first aspect of the invention are common to both the open and closed cell expanded rubber articles.

In a releasing step (ii), the moulded blank 3 is released from the first mould 1 and expands further to form an expanded moulded blank 4.

In step (iii) the expanded moulded blank 4 is transferred into a second mould 5.

In a further curing step (iv), the expanded moulded blank 4 is further cured and expanded to form an expanded rubber article 6 in a cavity of the second mould 5.

The expanded rubber article 6 is removed from the second mould 5 in step (v).

Figure 2:
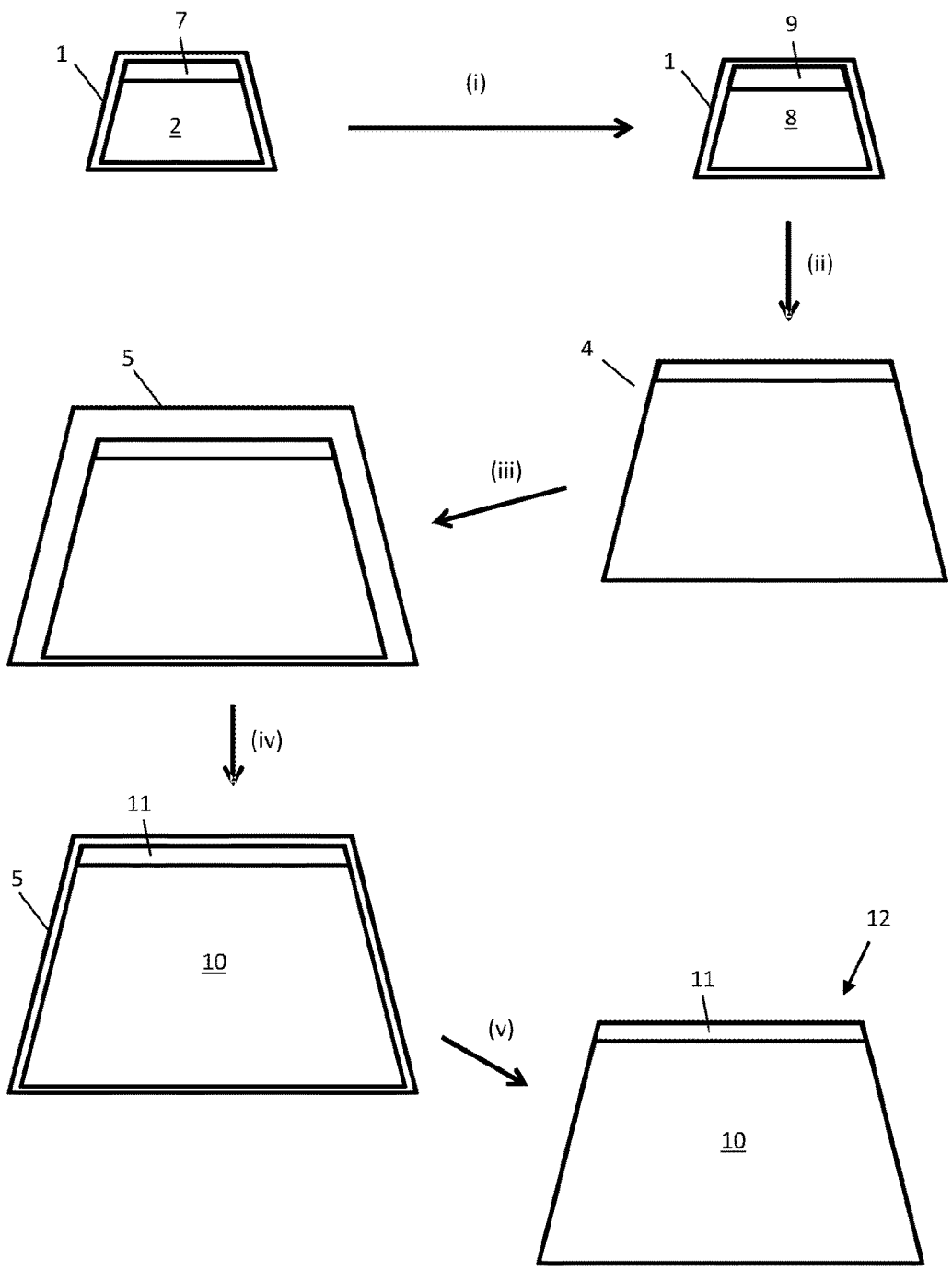
FIG. 2 shows a depiction of the steps of a process according to a second embodiment of the invention.

FIG. 2 shows a second embodiment of a process for making an expanded rubber article 12 according to the first aspect of the invention.

To form an expanded rubber article 12 comprising an closed cell expanded rubber part 11 and a solid rubber part 10, a cavity of a first mould 1 is substantially entirely filled with an expandable rubber formulation 2 and an additional solid rubber formulation 7. During a moulded blank formation step (i), the expandable rubber formulation 2 is heated to partially cure and expand it to form a moulded blank comprising partially cured and expanded rubber part 8 and partially cured solid rubber part 9.

In releasing step (ii), the moulded blank is released from the first mould 1 and expanded further to form an expanded moulded blank 4.

In step (iii), the expanded moulded blank 4 is transferred into a second mould 5.

In further curing step (iv), the expanded moulded blank 4 is further cured and expanded to form an expanded moulded rubber article 12 comprising further cured and expanded rubber part 10 and further cured solid rubber part 11 in a cavity of second mould 5.

The expanded rubber article 12 is removed from the second mould 5 in step (v).

Figure 3:
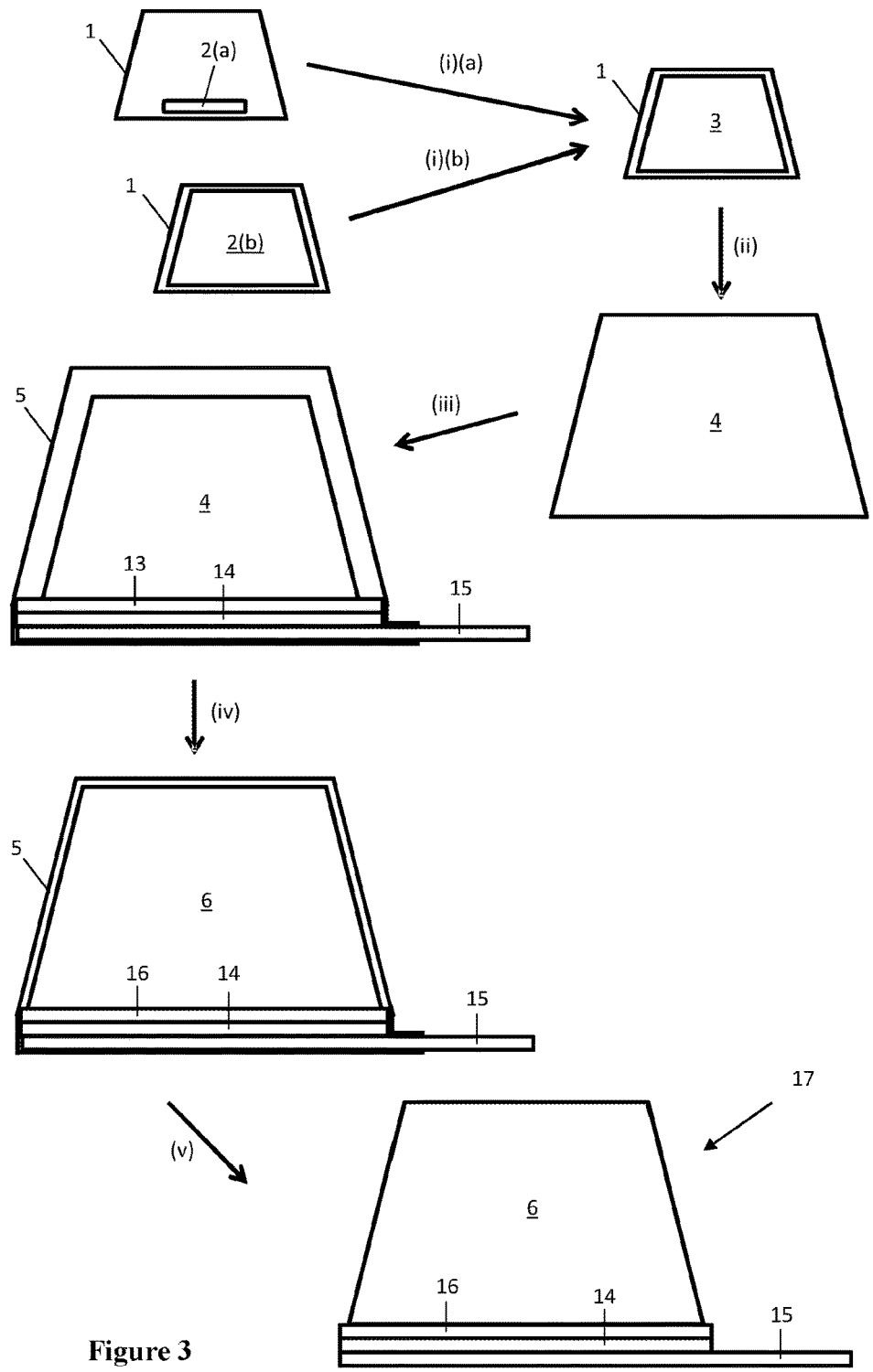
FIG. 3 shows a depiction of the steps of a process according to a third embodiment of the invention.

FIG. 3 shows a process according to the second aspect of the invention for making an expanded rubber product 17 of the third aspect of the invention.

To form an expanded rubber article comprising an open cell expanded rubber article, a cavity of first mould 1 is partially filled with an expandable rubber formulation 2(*a*). During a moulded blank formation step (i)(a), the expandable rubber formulation 2(*a*) is heated to partially cure and expand it to form a moulded blank 3.

To form an expanded rubber article comprising a closed cell expanded rubber article, a cavity of first mould 1 is substantially entirely filled with an expandable rubber formulation 2(*b*). During a moulded blank formation step (i)(b), the expandable rubber formulation 2(*b*) is heated to partially cure and expand it to form a moulded blank 3.

The remaining steps of the process according to the third aspect of the invention are common to both the open and closed cell expanded rubber articles.

In a releasing step (ii), the moulded blank 3 is released from the first mould 1 and expands further to form an expanded moulded blank 4.

In step (iii), the expanded moulded blank 4 is transferred into second mould 5 together with an additional rubber formulation 13. A substrate comprising a base material 15 and an elastomer bonding agent 14 and the second mould 5 together form a second mould cavity.

In a further curing step (iv), the expanded moulded blank 4 is further cured and expanded to form an expanded rubber article 6 in the second mould cavity formed by the second mould 5 and the substrate. Also in the further curing step (iv), the additional rubber formulation 13 is at least partially cured to form a solid rubber part 16 bound to the expanded rubber article 6 and the elastomer bonding agent 14 of the substrate. The further curing step (iv) thus provides expanded rubber article 6 adhered to a substrate comprising base material 15 and elastomer bonding agent 14 via solid rubber part 16.

An expanded rubber product 17, comprising the expanded rubber article 6, the solid rubber part 16 and the substrate comprising the base material 15 and the elastomer bonding agent 14, is removed from the second mould 5 in a removal step (v).

Figure 4:
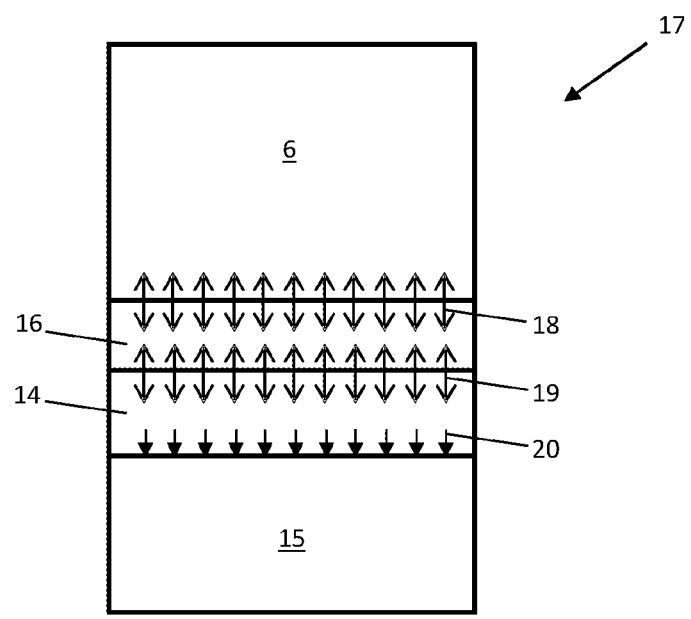
FIG. 4 is a schematic diagram of the bonding between the materials in the product prepared according to the second aspect of the invention.

FIG. 4 shows the bonding between materials in a product prepared according to the second aspect of the invention.

Expanded rubber product 17 comprises an expanded rubber article 6 adhered to a substrate comprising a base material 15 and an elastomer bonding agent 14 via a solid rubber part 16. The expanded rubber article 6 is bound to solid rubber part 16 by means of crosslinking bonds 18 between rubber polymers in the expanded rubber article 6 and rubber polymers in the solid rubber part 16. The elastomer bonding agent 14 is bound to solid rubber part 16 by means of crosslinking bonds 19 between rubber polymers in the solid rubber part 16 and polymers in the elastomer bonding agent 14. The elastomer bonding agent 14 is bound to base material 15 by means of absorption 20 of elastomer bonding agent 14 onto the surface of base material 15.

Figure 5:
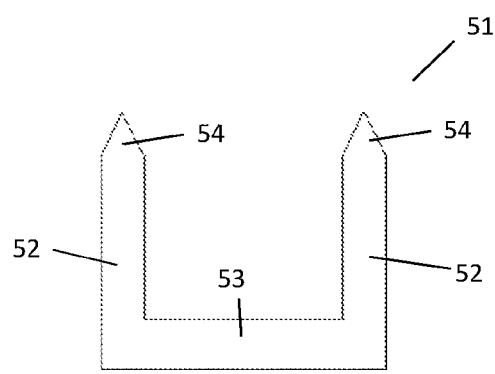
FIG. 5 shows a plan view of a clip for use with the moulded tyre of the fourth aspect of the invention.

FIG. 5 shows a plan view of a clip 51 for use with the tyre of the fourth aspect of the invention. The clip 51 is in the shape of a flattened U, having two substantially parallel straight arms 52 extending perpendicularly from a straight crosspiece 53, the ends of the arms being pointed at their free ends 54 to permit convenient insertion of the arms 52 into the sidewall of a moulded tyre. In use, the pointed ends 54 of the clip 51 are forced into the sidewall of a tyre by applying a force against the crosspiece 53 until the arms 52 are fully embedded in the tyre. Once installed in the tyre, the clip can be used to push the tyre into pace inside a wheel rim, for example by applying force again to the crosspiece 53 to squash the tyre into the wheel rim, thereby giving an interference fit. Conveniently, the crosspiece 53 of the clip provides a hard surface that is less susceptible to damage when pushed against to force the tyre onto the wheel than, for example, the surface of the tyre itself.

Figure 6:
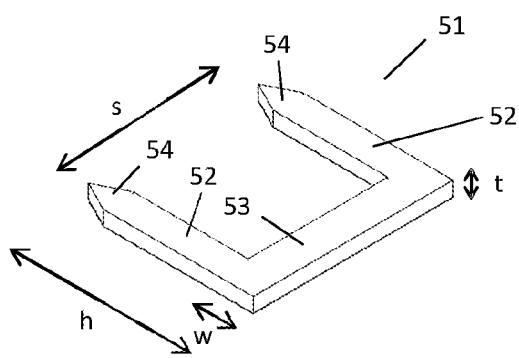
FIG. 6 shows a perspective view of the clip of FIG. 5.

FIG. 6 shows a perspective view of the clip 51 of FIG. 5, the parts of the clip 51 being labelled with the same reference numerals used in FIG. 5. The clip 51 has a span s of around 17 mm, a height h of around 18 mm, a width w of around 3.5 mm and a material thickness t of around 1.5 mm. The clip 51 is made from metal (more particularly, stainless steel). Alternatively, the clip could be made from a plastic material, for example glass filled nylon.

EXAMPLES

Embodiments of the invention will now be illustrated by means of the non-limiting examples.

Example 1

The preparation of an expanded rubber product comprising an expanded rubber part bound to an aluminium metal part via a solid rubber part is described. The expanded rubber product is a wheel having a 390 mm diameter and a 140 mm width. The example shows how an expanded rubber part can be bonded to and shaped over an aluminium wheel hub.

The skilled reader will appreciate that following mixing procedures are standard rubber industry mixing procedures that provide a good level of dispersion of ingredients. The mixed expandable rubber formulation and the mixed additional rubber formulation should be processed (cured) within 3 months of the mixing date.

1) Preparation of an Expandable Rubber Formulation

An expandable rubber formulation was prepared using an elastomeric material comprising a blend of natural rubber (NR) & styrene butadiene rubber (SBR) rubber polymers. The components of the expandable rubber formulation are listed in Table 1.

TABLE 1

| Material | Material Type | Expandable rubber formulation | Additional rubber formulation |
|---|---|---|---|
| NR/SBR Rubber Polymer Blend | Elastomeric Material | 100 | 100 |
| Carbon Black | Filler | 30 | 30 |
| Synthetic Wax | Process Aid | 2 | 2 |
| Clay | Filler | 7.5 | 7.5 |
| Process Oil | Processing Aid | 20 | 20 |
| Amine Anti-degradent | Anti-degradent | 1 | 1 |
| Zinc Oxide | Curing Agent | 3 | 3 |
| Stearic Acid | Curing Agent | 2 | 2 |
| Sulphenamide Accelerator | Curing Agent | 1 | 1 |
| Sulphur Crosslinking Medium | Curing Agent | 2.5 | 2.5 |
| Blowing Agent (Nitrogen releasing) | Expansion Agent | 15 | 0 |
| Total PHR | | 184 | 169 |

The Polymers and Expansion Agents were first pre-blended on a 48" (1.22 m) two roll mill, then the bulk materials (Polymers/Expansion Agents, Process Aids, Fillers and anti-degradent) were internally mixed in a 45 litre Banbury mixer at 35 rotations per minute (RPM), with water cooled to 30° C. and the mixed formulation dumped at a temperature of 115° C. The Curing Agents were mixed in with the bulk materials on the two roll mill 24 hours later. The mixed expandable rubber formulation was sheeted off the two roll mill in a 10 mm thick sheet. The roll mills used a standard friction ratio and water cooling to 30° C.

The shore hardness (Instron Shore A) of the skin of a tube formed from a section of the sheet of mixed expandable rubber formulation (45 mm inside diameter×70 mm outside diameter×50 mm wide) cured for 8 minutes at 150° C. was 35. Part of the skin was removed and the cut cellular surface of the tube was found to have a Shore hardness (Instron Shore A) of 25.

2) Preparation of an Additional Rubber Formulation

An additional rubber formulation compatible with the expandable rubber formulation was also prepared. The components of the additional rubber formulation are listed in Table 1.

The additional rubber formulation was mixed in one stage on an 18" (0.46 m) two roll mill, with the Polymers, Process Aids and Fillers added at the start of the mix cycle, and then the Curing Agents added 4 minutes into the 6 minute mixing cycle. The mixed additional rubber formulation was sheeted off the mill in a 2 mm thick sheet. The roll mills used a standard friction ratio and water cooling to 30° C.

3) Formation of the Expanded Moulded Blank

A 10 mm thick sheet of mixed expandable rubber formulation from step (1) was cut to 100 mm width×830 mm length and butt-joined to form a band. The band was compression moulded in a first mould (an aluminium compression mould) positioned between the pre-warmed platens of a hydraulic press for 22 minutes at 152° C. to form a moulded blank in the shape of a band. The moulded blank was released from the first mould and allowed to expand to form an expanded moulded blank in the form of a band having approximate dimensions of 1200 mm circumference×150 mm width×12.5 mm thick. To aid release from the mould, a mould release agent was used.

The expanded moulded blank was left to cool for one hour at room temperature.

4) Preparation of the Substrate and Stabilisation of the Expanded Moulded Blank

An aluminium wheel hub of 365 mm diameter×140 mm width with 3 mm ventilation holes drilled through the base at 50 mm intervals was first abraded and then cleaned with a ketone cleaning solvent. A layer of elastomer bonding agent primer (EBAP) was applied to the abraded and cleaned surface by brush and then dried for 5 minutes at 50° C. in a fan assisted oven. A layer of elastomer bonding agent (EBA) was applied to the dried EBAP by brush and then dried for 5 minutes at 50° C. in a fan assisted oven. A 140 mm wide 1100 mm long section of a 2 mm thick sheet of mixed additional rubber formulation from step (2) was applied to the aluminium wheel hub over the dried EBA layer under finger pressure using a rotating jig. The outer surface of the additional rubber formulation was then solvent-wiped with the ketone cleaning solvent.

The inner surface of the cooled expanded moulded blank from step (3) was solvent-wiped with the ketone cleaning solvent and then placed over the expandable rubber formulation applied to the aluminium wheel hub. The expanded moulded blank/additional rubber formulation/wheel hub assembly was then left for 24 hours, in which time the expanded moulded blank shrank and contracted around the wheel, increasing the pressure between the materials at the expanded moulded blank/additional rubber formulation and the additional rubber formulation/wheel hub interfaces.

5) Further Curing of the Expanded Moulded Blank

The expanded moulded blank/additional rubber formulation/wheel hub assembly from step (4) was placed and clamped in a pre-warmed two part second mould (an aluminium tyre mould) and then heated for 40 minutes at 185° C. in an oven to form the expanded rubber product. The mould was removed from the oven and then left to cool at room temperature for 24 hours with the expanded rubber product still clamped inside. After cooling, the expanded rubber product was removed from the mould with the expanded rubber part having dimensions set to the mould profile.

Example 2

The preparation of an expanded rubber product comprising two stainless steel plates bonded to an expanded rubber part via two solid rubber parts is described. The example shows how an expanded rubber part can be bonded to and sandwiched between two metal plates thereby providing vibration damping between the plates. In this example, the further curing step is performed using partially open tooling.

The skilled reader will appreciate that the following mixing procedures are standard rubber industry mixing procedures that provide a good level of dispersion of ingredients. The mixed expandable rubber formulation and the mixed additional rubber formulation should be processed (cured) within 3 months of the mixing date.

1) Preparation of a Mixed Expandable Rubber Formulation

An expandable rubber formulation with good damping properties i.e. relatively high hysteresis (or Tan Delta values as measured by a Dynamic Mechanical Analyser) was prepared comprising a blend of two polymers, one of which having relatively high hysteresis or tan Delta value (i.e. the blended compound has a tan Delta value of greater than 0.4 at −10° C., 10 Hz, 0.14% double strain amplitude (DSA) & shear mode). The components of the expandable rubber formulation are listed in Table 2.

TABLE 2

| Material | Material Type | Expandable rubber formulation | Additional rubber formulation |
|---|---|---|---|
| SBR/BIIR Rubber Polymer Blend | Elastomeric Material | 100 | 0 |
| NR/SBR Rubber polymer blend | Elastomeric Material | 0 | 100 |
| Carbon Black | Filler | 20 | 60 |
| Synthetic Wax | Process Aid | 2 | 2 |
| Clay | Filler | 0 | 7.5 |
| Cross-linked Oil | Process Aid | 15 | 0 |
| Process Oil | Process Aid | 0 | 20 |
| Amine Anti-degradent | Anti-degradent | 1 | 1 |
| Zinc Oxide | Curing Agent | 3 | 3 |
| Stearic Acid | Curing Agent | 2 | 2 |
| Sulphenamide Accelerator | Curing Agent | 1 | 1 |
| Sulphur Crosslinking Medium | Curing Agent | 2.5 | 2.5 |
| Blowing Agent (Nitrogen releasing) | Expansion Agent | 7.5 | 0 |
| Total PHR | | 154 | 169 |

The Polymers and the Expansion Agents were first pre-blended on a 48" (1.22 m) two roll mill, then the bulk materials (Polymers, Expansion Agents, Fillers, Process Aids and anti-degradent) were internally mixed in a 45 litre Banbury (at 35 RPM, with water cooled to 30° C. and the mixed formulation dumped at a temperature of 115° C.). The Curing Agents were mixed in with the bulk materials on a mill 24 hours later. The mixed expandable rubber formulation was sheeted off the mill in a sheet 10 mm thick. The rolls mills used a standard friction ratio and water cooling to 30° C.

The shore hardness (Instron Shore A) of the skin of a tube formed from a section of the sheet of mixed expandable rubber formulation (45 mm inside diameter×70 mm outside diameter×50 mm wide) cured for 8 minutes at 150° C. was 25. Part of the skin was removed and the cut cellular surface of the tube was found to have a Shore hardness (Instron Shore A) of 15.

2) Preparation of a Mixed Additional Rubber Formulation

An additional rubber formulation was formulated to be compatible with both the expandable rubber formulation and the application service requirements i.e. it was formulated to provide a relatively flexible solid rubber part when cured. The components of the additional rubber formulation are listed in Table 2. The polymer blend included in the additional rubber formulation lacked the high hysteresis/high tan Delta polymer.

The additional rubber formulation was mixed in one stage on an 18" (0.46 m) two roll mill, with the Polymers, Process Aids and Fillers added at the start, and then the Curing Agents added 4 minutes into the 6 minute mixing cycle. The mixed additional rubber formulation was sheeted off the mill in a sheet 2 mm thick. The rolls mills used a standard friction ratio and water cooling to 30° C.

The skilled reader will appreciate that the above mixing procedures are standard rubber industry mixing procedures that provide a good level of dispersion of ingredients.

The expandable rubber formulation and the additional rubber formulation should be processed (cured) within 3 months of the mixing date.

3) Extrusion of the Mixed Expandable Rubber Formulation

The mixed expandable rubber formulation from step (1) was extruded into tubes using a Barwell extruder. The extruded tube dimensions were 25 mm internal diameter×50 mm outside diameter and had a weight of 58 g.

4) Calendaring of the Mixed Additional Rubber Formulation

The mixed additional rubber formulation from step (2) was calendered to form sheets 0.5 mm thick×300 mm wide to form sheets of calendared additional rubber formulation.

5) Formation of the Expanded Moulded Blank

The extruded tubes of step (3) were pre-warmed in an air oven at 65° C. for 20 minutes. A hydraulic press having 600 mm square platens was pre-warmed to 150° C. for 4 hours together with a first mould (a multi cavity compression mould having cavities with 51 mm outside diameter×25 mm inner diameter×and 31 mm depth).

The pre-warmed extruded tubes were inserted into the cavities of the first mould, and the first mould was pressed shut by the hydraulic press. The extruded tubes of mixed expandable rubber formulation were heated for 9 minutes at 150° C. to form moulded blanks. The moulded blanks were released and promptly removed from the first mould to allow them to expand to form expanded moulded blanks. Excess edge rubber was removed from the expanded moulded blanks (i.e. they were de-flashed). To aid release from the first mould a mould release agent was used. The expanded moulded blanks were around 5 times the size (by volume) of the cavities of the first mould, and weighed around 50 g.

The expanded moulded blanks were allowed to shrink and stabilise for 72 hours on a work top at room temperature to form stabilised moulded blanks.

6) Preparing the Laminated Expanded Moulded Blanks

The stabilised expanded moulded blanks from step (5) were mounted on a lathe and cut into 3 mm thick ring slices. Both planar sides of the 3 mm ring slices were laminated with portions of the 0.5 mm thick sheets calendered additional rubber formulation from step (4) to form laminated slices. A polyethylene liner was then applied to the outer, planar ends of the laminated slices. A polypropylene liner could have been used.

The lined laminated slices were placed under pressure between metal plates having a load of at least 6 kg for 24 hours. The pressed laminated slices were then dye cut with a fly press having a metal punch to form the laminated expanded moulded blanks.

7) Further Curing of the Expandable Rubber Formulation

A pair of stainless steel substrate plates 0.9 mm thick and having approximately the same shape as the laminated expanded moulded blanks of step (6) were provided for each dye cut laminated expanded moulded blank. The stainless steel substrate plates were abraded and degreased; then one side of each plate was partially coated with an EBAP by brush (although the partial coating could have been sprayed on) and left to air dry. A partial coating of an EBA was painted on over the EBAP coating (although this coating could also have been sprayed on) and left to air dry. As an alternative, both coatings could have been dried for 5 minutes at 50° C. in an oven. The coatings were applied only to the areas of the stainless steel substrate plates that were to be bonded to the laminate. Masking tape was used to prevent unwanted application of the coatings to other parts of the plates.

The polyethylene liners were removed from the laminated expanded moulded blanks of step (6), and each laminated expanded moulded blank was placed between a pair of partially coated stainless steel substrate plates such that the outer additional rubber formulation layers of the laminated expanded moulded blanks were brought into contact with the parts of the stainless steel substrate plates coated with the EBAP and the EBA to form sandwich assemblies. The sandwich assemblies were then placed in open-sided restraining tools sized to hold a pair of stainless steel substrate plates against a die cut laminated slice. Each combined tool and sandwich assembly was heated in an oven for 20 minutes at 185° C. to further cure and expand the expandable rubber formulation to form an expanded rubber part, to at least partially cure the two layers of additional rubber formulation to form a pair of solid rubber parts, and to bond the expanded rubber part to the stainless steel substrate plates via the solid rubber parts to form the expanded rubber product.

Following heating, the combined tool and expanded rubber products were removed from the oven, and the expanded rubber products were removed from the tools. The expanded rubber products were allowed to shrink and stabilise for 24 hours at room temperature. The stabilised expanded rubber products had overall thicknesses of 5.7 mm+/−0.1 mm.

Example 3

The preparation of an expanded rubber product comprising a hollow expanded rubber part bound to a solid rubber part is described. The expanded rubber product is a tyre having a 400 mm diameter and a 25 mm width. The example shows how an expanded rubber part having a cavity can be moulded, how an expanded rubber part can be bonded to a solid rubber part in the moulded blank formation step, and how two or more expanded moulded blanks can be bonded together during the further curing step. In this example, the moulded blank comprising an expanded rubber part and a solid rubber part is shaped into a tyre using a mould and wheel shaped insert during the further curing step.

The skilled reader will appreciate that the following mixing procedures are standard rubber industry mixing procedures that provide a good level of dispersion of ingredients. The mixed expandable rubber formulation and the mixed additional rubber formulation should be processed (cured) within 3 months of the mixing date.

1) Preparation of an Expandable Rubber Formulation

An expandable rubber formulation was prepared comprising a blend of two polymers. The expandable rubber formulation also comprised a carbon black, an inorganic filler, process aids, a wax, an anti-degradent, curing agents and a blowing agent The components of the expandable rubber formulation are listed in Table 3.

TABLE 3

| Material | Material Type | Expandable rubber formulation | Additional rubber formulation |
| --- | --- | --- | --- |
| NR/SBR/BR Rubber Polymer Blend | Elastomeric Material | 100 | 100 |
| Carbon Black | Filler | 20 | 30 |
| Clay | Filler | 20 | 20 |
| Synthetic Wax | Process aid | 2 | 2 |
| Process Oil | Process aid | 5 | 5 |
| Amine Anti-degradent | Anti-degradent | 1 | 1 |
| Zinc oxide | Curing Agent | 3 | 3 |
| Stearic acid | Curing Agent | 2 | 2 |
| Sulphenamide Accelerator | Curing Agent | 1 | 1 |
| Sulphur Crosslinking medium | Curing Agent | 2.5 | 2.5 |
| Blowing agent (Nitrogen releasing) | Expansion Agent | 12 | 0 |
| Total PHR | | 168.5 | 166.5 |

The Polymers and Expansion Agents were first preblended on a 48" (1.22 m) two roll mill, then the bulk materials (Polymers/Expansion Agents, Process Aids, Fillers and Anti-degradent) were internally mixed in a 45 litre Banbury (at 35 rotations per minute (RPM), with water cooled to 30° C. and the mixed formulation dumped at a temperature of 115° C.). The Curing Agents were mixed in with the bulk materials on a two roll mill 24 hours later. The mixed expandable rubber formulation was sheeted off the two roll mill in a sheet 8 mm thick. The roll mills used a standard friction ratio and water cooling to 30° C. Alternatively, to improve dimensional control, the material could be calendered out (using a three or four bowl calendar) into a sheet 8 mm thick×600 mm wide wound onto a roll using a cardboard core with polyethylene liner.

The shore hardness (Instron Shore A) of the skin of the expandable rubber tire core formed from a section of the sheet of mixed expandable rubber formulation (10 mm inside diameter×20 mm outside diameter×300 mm long) cured for 10 minutes at 150° C. was 55 shore.

2) Preparation of an Additional Rubber Formulation

An additional solid rubber formulation (tread) compatible with the expandable rubber formulation (core) was also prepared. The components of the additional rubber formulation are listed in Table 3.

The additional rubber formulation was mixed in one stage on an 18" (0.46 m) two roll mill, with the Polymers, Process Aids and Fillers added at the start of the mix cycle, and then the Curing Agents added 4 minutes into the 6 minute mixing cycle. The mixed additional rubber formulation was sheeted off the mill in a 2 mm thick sheet. The roll mills used a standard friction ratio and water cooling to 30° C.

3) Formation of the Expanded Moulded Blank (Tyre Core) Bonded to a Solid Rubber Formulation (Tyre Tread)

The 8 mm thick sheet of mixed expandable rubber formulation from step (1) was cut to form a strip 60 mm wide×300 mm long. The 2 mm thick sheet of additional solid rubber formulation was cut into a strip 32 mm wide and 300 long and laminated to the middle of the strip of expandable rubber formulation that had been previously cleaned or 'freshened' using a solvent wipe. The reverse side of the laminated strip of expandable rubber formulation was wrapped around the middle of a 450 mm long steel mandrel having a 10 mm diameter. (Alternatively, an extruder having an appropriate die in the extruder head could be used to coextrude an equivalent tube of expandable rubber formulation and additional solid rubber formulation, and then a steel insert could be placed inside the extruded tube). The laminated tube blank and steel mandrel assembly was pre-warmed for 20 minutes at 70° C. and then placed in a first stage mould (an aluminium compression mould having a cavity 300 mm long and 20 mm in diameter, the mould comprising 10 mm diameter slots at each end of the cavity to accommodate the ends of the steel mandrel) The mould, laminated tube blank and steel mandrel assembly was then positioned between the pre-warmed platens of a hydraulic press and cured for 10 minutes at 150° C. to form a moulded blank in the shape of a tube having a tread bonded onto the upper surface. The moulded tube with bonded tread was released from the first mould and the steel insert removed, then the moulded tube with bonded tread was allowed to expand to form an expanded moulded blank comprising an expanded rubber part (tube) bonded to a solid rubber part (tread) having approximate dimensions of 20 mm diameter× 300 mm long and having a 10 mm (approx.) diameter internal cavity. To aid release from the mould a mould release agent was used. The expanded moulded blank was left to cool for one hour at room temperature. The resulting cooled expanded moulded blank comprised a tubular expanded rubber part having a circumference of approximately 63 mm, and a solid rubber part extending along the length of the tubular expanded rubber part and around approximately 32 mm of its circumference.

4) Preparation of the Tyre Blank for Further Curing Step

The surface of the ends of five 20 mm diameter×300 mm long tubular moulded blanks comprising an expanded rubber part (tube) and a solid rubber part (tread) were cut off, and the exposed end surfaces coated with an EBA. The coated ends were dried for 10 minutes at 50° C. (or air dried at room temperature for 1 hour) and then the moulded blanks tacked together inside a 400 mm diameter wheel-shaped aluminium mould insert. High temperature tape was used to tack the blanks in place around the insert.

5) Further Curing of the Expanded Moulded Blank

The wheel-shaped insert of step 4, containing the five tacked together moulded blanks, was fitted into a pre-warmed two part second mould (an aluminium tyre mould), and the resulting assembly clamped together. The clamped assembly was heated for 40 minutes at 185° C. in an oven to form the expanded rubber product (tyre with tread). The clamped assembly was then removed from the oven and left to cool at room temperature for 24 hours (with the expanded rubber product still clamped inside). After cooling, the expanded rubber product was removed from the mould, and the high temperature tape was removed. The expanded rubber product had dimensions matching the mould profile, i.e. 400 mm diameter×25 mm width×35 mm depth (the expanded moulded blank expanded further in the second stage to be shaped by the profile of the wheel-shaped insert).

Example 4

The preparation of an expanded rubber bound to a solid rubber material is described. More particularly, the preparation of a tyre based on a high modulus/low weight expandable rubber core and a solid rubber tread initially bonded together in the first moulding stage is described. The expanded rubber product is a tyre having a 630 mm diameter and a 35 mm width. The example shows how a rubber part can be bonded to a tread in the first moulding and curing stage and then shaped into a tyre using a mould and wheel-shaped insert during a further curing step.

The following mixing procedures are standard rubber industry mixing procedures that provide a good level of dispersion of ingredients. The mixed expandable rubber formulation and the mixed additional rubber formulation should be processed (cured) within 3 months of the mixing date.

6) Preparation of an Expandable Rubber Formulation

An expandable rubber formulation comprising a blend of two polymers was prepared. The expandable rubber formulation also comprised a carbon black, an inorganic filler, a process oil, a wax, an anti-degradent, curing agents and a blowing agent. The components of the expandable rubber formulation are listed in Table 4.

TABLE 4

| Material | Material Type | Expandable rubber formulation | Additional solid rubber formulation |
| --- | --- | --- | --- |
| Polymer 1 | Polymer | 70 | 70 |
| Polymer 2 | Polymer | 30 | 30 |
| Carbon Black | Filler | 45 | 30 |
| Inorganic filler | Filler | 25 | 20 |
| Wax | Process aid | 2 | 2 |
| Process aid | Process aid | 10 | 5 |

TABLE 4-continued

| Material | Material Type | Expandable rubber formulation | Additional solid rubber formulation |
|---|---|---|---|
| Anti-degradent | Anti-degradent | 1 | 1 |
| Metal oxide | Curing Agent | 3 | 3 |
| Organic acid | Curing Agent | 2 | 2 |
| Accelerator | Curing Agent | 1 | 1 |
| Crosslinking medium | Curing Agent | 2 | 2 |
| Blowing agent Agent | Expansion | 12 | 0 |
| Total PHR | | 203 | 162 |

The Polymers and Expansion Agents were first preblended on a 48″ (1.22 m) two roll mill, then the bulk materials (Polymers/Expansion Agents, Process Aids, Fillers and anti-degradent) were internally mixed in a 45 litre Banbury (at 35 rotations per minute (RPM), with water cooled to 30° C. and the mixed formulation dumped at a temperature of 115° C.). The Curing Agents were mixed in with the bulk materials on a two-roll mill 24 hours later. The mixed expandable rubber formulation was sheeted off the two-roll mill in an 8 mm thick sheet. The roll mills used a standard friction ratio and water cooling to 30° C. Note: for improved dimensional control the material could also be calendered out (using a three or four bowl calendar) into 8 mm thick×600 mm wide sheet wound onto a roll using a cardboard core with polyethylene liner.

The shore hardness (Instron Shore A) of the skin of the expandable rubber tyre core formed from a section of the sheet of mixed expandable rubber formulation (10 mm inside diameter×20 mm outside diameter×300 mm long) cured for 10 minutes at 150° C. was 55 shore.

7) Preparation of an Additional Rubber Formulation

An additional solid rubber formulation (tread) compatible with the expandable rubber formulation was also prepared. The components of the additional rubber formulation are listed in Table 4.

The additional rubber formulation was mixed in one stage on an 18″ (0.46 m) two roll mill, with the Polymers, Process Aids and Fillers added at the start of the mix cycle, and then the Curing Agents added 4 minutes into the 6 minute mixing cycle. The mixed additional rubber formulation was sheeted off the mill in a 2 mm thick sheet. The roll mills used a standard friction ratio and water-cooling to 30° C.

8) Formation of the Expanded Moulded Blank (Tyre Core) Bonded to a Solid Rubber Formulation (Tyre Tread)

The expandable rubber formulation from step (1) was extruded into a 'cone' shaped profile (32 mm×30 mm) cut to 1850 mm length (1.35 kg approx.). The standard rubber extruder uses barrel, head and die temperatures from 60° C. to 80° C. at 180 cm per minute speed. Then the 2 mm thick solid rubber formulation was cut to 35 mm width and 1850 mm length and laminated to the middle of the 1850 mm long expandable rubber profile, (Note: the same profile could also be extruded with the solid rubber formulation coextruded onto the expandable rubber formulation). The pre-warmed (20 minutes at 70° C.) laminated blank was then compression moulded in a first stage mould (able to mould a single-piece ring). The butt-joined extruded blank was positioned between the pre-warmed platens of a hydraulic press and then cured for 10 minutes at 150° C. to form a moulded blank in the shape of a tyre. The moulded tyre with bonded tread was allowed to expand to form an expanded moulded blank with solid rubber bonded tread. To aid release from the mould a mould release agent was used. The expanded moulded blank was left to cool for one hour at room temperature.

9) Preparation of the Tire Blank for Further Curing Step

The mould stage one blank tyre (1.2 kg approx.) was then installed onto a 26 inch bicycle wheel-shaped insert for the second vulcanisation step 10) Further Curing of the Expanded Moulded Blank The mould stage one blank tyre and wheel-shaped insert of step 9 was positioned in a pre-warmed further two-part curing mould having tread pattern and 16 ventilation holes incorporated into the sidewall portions of the curing mould, and then the assembly was clamped together. The clamped assembly was heated for 40 minutes at 185° C. in an oven to form the expanded rubber product (tyre with tread). The mould was removed from the oven and the expanded rubber product was removed from the mould and left to cool for 24 hours.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A process for making an expanded rubber article, wherein the process comprises:
   a) a moulded blank formation step, in which an expandable rubber formulation, comprising an elastomeric material, a curing agent and an expansion agent, is heated in a first mould cavity to partially cure the expandable rubber formulation thereby forming a moulded blank, wherein the first mould cavity confines expansion of the expandable rubber formulation;
   b) a releasing step, in which the moulded blank is released from the first mould cavity, and in which the moulded blank expands to a volume larger than the volume of the first mould cavity thereby forming an expanded moulded blank;
   c) a stabilisation step, in which the expanded moulded blank is left to stabilise until the volume of the expanded moulded blank is substantially constant; and,
   d) a further curing step, in which the stabilised expanded moulded blank is heated to further cure and expand the expandable rubber formulation thereby forming the expanded rubber article;
   wherein the expanded moulded blank is heated in a second mould cavity in further curing step (d).

2. The process according to claim 1, wherein the elastomeric material comprises one or more rubber polymers selected from styrene butadiene rubber, butadiene rubber, natural rubber and ethylene propylene diene monomer rubber.

3. The process according to claim 1, wherein the expandable rubber formulation comprises ethylene propylene diene monomer rubber and, optionally, a peroxide cure system.

4. The process according to claim 1, wherein the expanded rubber article is cooled to a temperature of from 10° C. to 80° C. and then removed from the second mould cavity.

5. The process according to claim 1, wherein the expanded moulded blank is left to stabilise for a period of at least 24 hours.

6. The process according to claim 1, wherein the expanded moulded blank is contacted with an additional rubber formulation during the stabilisation step.

7. The process according to claim 1 additionally comprising:
   e) a surface preparation step, in which at least part of a surface of the expanded moulded blank is removed;
   wherein the surface preparation step (e) is carried out after the releasing step (b) and before the further curing step (d).

8. The process according to claim 1, wherein an insert is included in the first mould cavity, and wherein the insert defines a void in the moulded blank.

9. The process according to claim 8, wherein the insert is removed from the expanded moulded blank before the expanded moulded blank is heated in the further curing step.

10. The process according to claim 1, wherein a plurality of expanded moulded blanks are contacted with each other in the further curing step.

11. The process according to claim 1, wherein the expandable rubber formulation is contacted with an additional rubber formulation during the moulded blank formation step (a), the additional rubber formulation comprising an elastomeric material and a curing agent, wherein the additional rubber formulation is partially cured with the expandable rubber formulation during the moulded blank formation step (a) to provide a moulded blank comprising a partially cured and expanded rubber part bound to a partially cured additional rubber part, and wherein the rubber of the partially cured additional rubber part is a solid rubber.

12. The process of claim 7, wherein the process comprises an extrusion step in which the expandable rubber formulation and the additional rubber formulation are coextruded prior to the moulded blank formation step (a).

13. The process according to claim 1, wherein the expanded moulded blank is contacted with an additional rubber formulation during the further curing step (d), the additional rubber formulation comprising an elastomeric material and a curing agent, wherein the additional rubber formulation is at least partially cured during the further curing step (d) to provide an expanded rubber article comprising an additional rubber part bound to an expanded rubber part, and wherein the rubber of the additional rubber part is a solid rubber.

14. The process according to claim 11, wherein the elastomeric material of the additional rubber formulation is the same as the elastomeric material of the expandable rubber formulation.

15. The process according to claim 11, wherein a substrate is present in or forms part of the second mould cavity during the further curing step (d), and wherein at least part of the additional rubber formulation is contacted with the substrate during further curing step (d).

16. The process according to claim 15, wherein the substrate comprises a base material at least partially coated with an elastomer bonding agent, and wherein at least part of the additional rubber formulation is contacted with the elastomer bonding agent during the further curing step (d), the elastomeric bonding agent being at least partially cured during the further curing step (d) to form an elastomeric bonding layer adhered to at least part of the solid rubber part.

17. An expanded rubber article made by the process of claim 1, wherein the expanded rubber article is an expanded rubber product comprising:
   an expanded rubber part;
   a solid rubber part; and,
   a substrate comprising a base material at least partially coated with an elastomer bonding layer;
   wherein the expanded rubber part is bound to the substrate via the solid rubber part.

18. The product according to claim 17, wherein both the expanded rubber part and the solid rubber part comprise one or more rubber polymers selected from the list consisting of natural rubber, styrene butadiene rubber and butadiene rubber.

19. The product according to claim 17, wherein the expanded rubber part is bound to the substrate by means of cross-linking bonds between the expanded rubber part and the solid rubber part, and between the solid rubber part and the elastomer bonding layer.

20. The product according to claim 17, wherein the base material is a metal.

* * * * *